United States Patent [19]

Hiroki et al.

[11] Patent Number: 4,962,430
[45] Date of Patent: Oct. 9, 1990

[54] IMAGE READING BODY AND IMAGE FORMATION BODY DETACHABLY MOUNTED TO A CONTROL BODY

[75] Inventors: Masashi Hiroki; Junichi Koseki, both of Tokyo; Tuyoshi Todome, Kawasaki, all of Japan

[73] Assignee: Kabushiki Kaisha Toshiba, Kawasaki, Japan

[21] Appl. No.: 423,879

[22] Filed: Oct. 19, 1989

[30] Foreign Application Priority Data

Oct. 31, 1988 [JP] Japan ................................ 63-275643

[51] Int. Cl.⁵ ...................... H04N 1/028; H04N 1/21; H04N 1/23
[52] U.S. Cl. .................................. 358/296; 358/401; 358/473; 358/483; 358/497; 346/145
[58] Field of Search ............... 358/296, 300, 408, 474, 358/400, 401, 473, 483, 497; 346/145; 361/392, 393, 394, 399; 355/260, 72, 75, 89

[56] References Cited

U.S. PATENT DOCUMENTS

| 4,251,153 | 2/1981 | Levine | 358/300 |
| 4,438,459 | 3/1984 | Levine | 358/408 |
| 4,652,937 | 3/1987 | Shimura | 358/473 |
| 4,695,896 | 9/1987 | Yamanishi | 358/296 |
| 4,704,638 | 11/1987 | Igarashi | 358/296 |
| 4,731,667 | 3/1988 | Watanabe | 358/475 |
| 4,757,344 | 7/1988 | Idenawa | 355/260 |

Primary Examiner—Bruce A. Reynolds
Assistant Examiner—Scott A. Rogers
Attorney, Agent, or Firm—Cushman, Darby & Cushman

[57] ABSTRACT

An image forming apparatus comprises a control main body, and reading and recording main bodies detachable to the control main body. The reading main body includes a first memory for storing a read image data memory of original. The recording main body includes a second memory for storing the read image data. The control main body includes a data transmitting circuit for transmitting the image data stored in the first memory to the second memory when the reading and recording main bodies are mounted on the control main body. The recording and reading main body does not only operate alone but also in a state combined with the control main body.

13 Claims, 21 Drawing Sheets

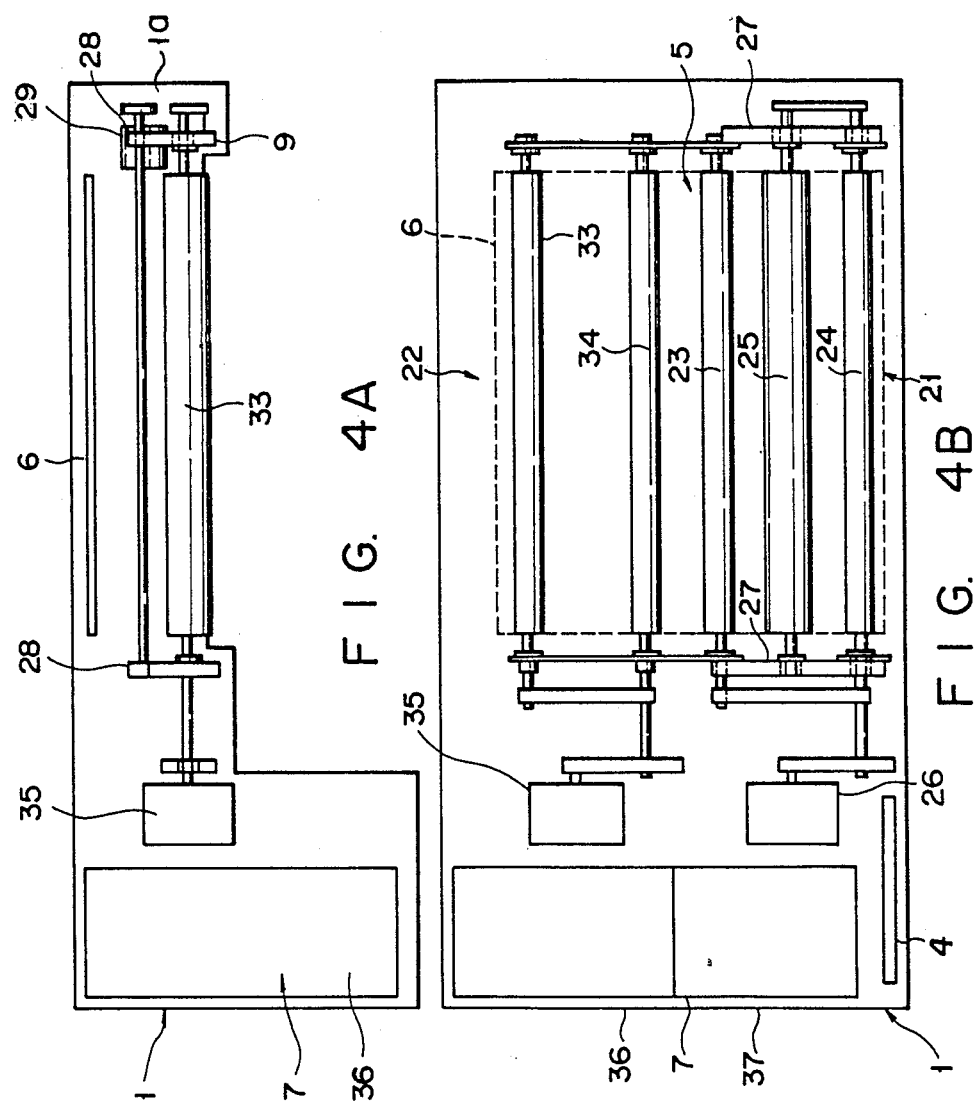
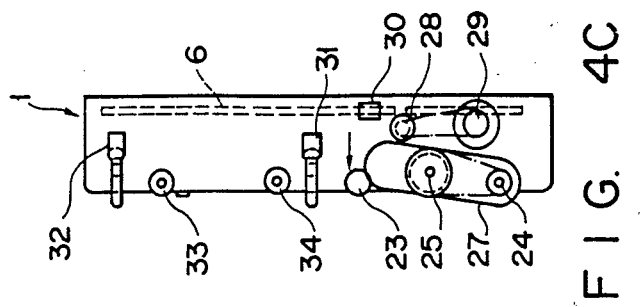

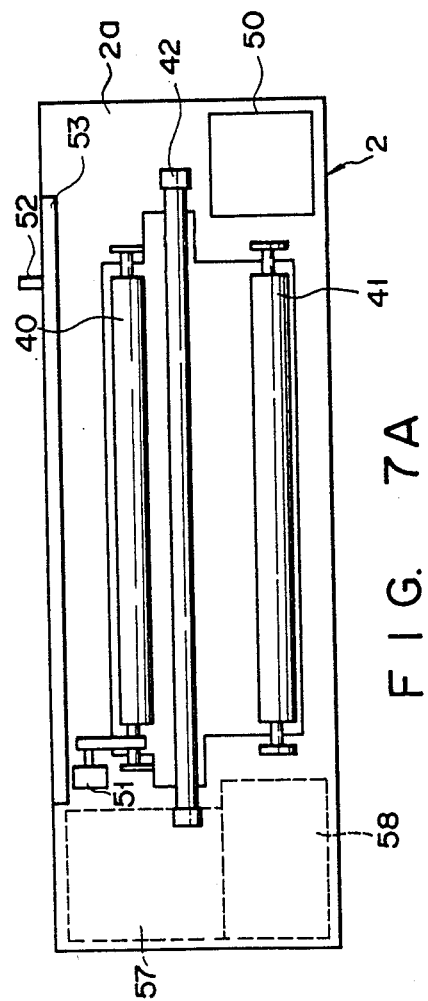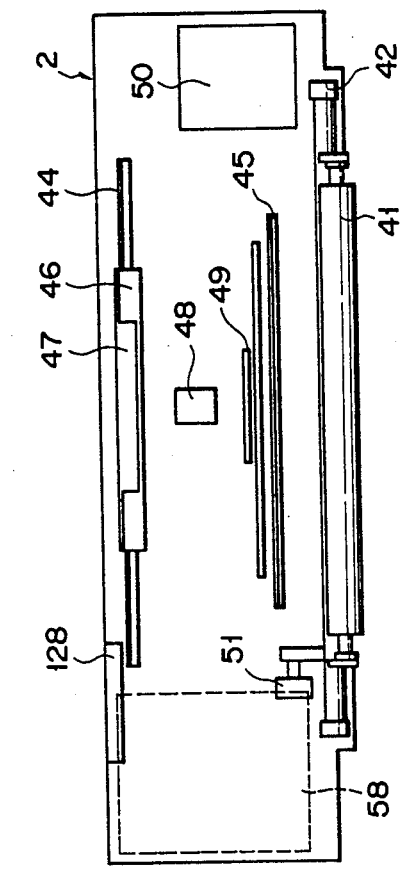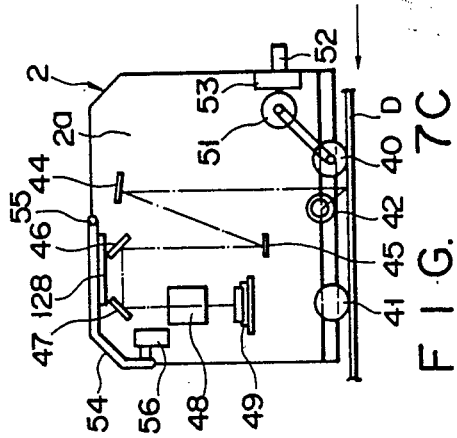

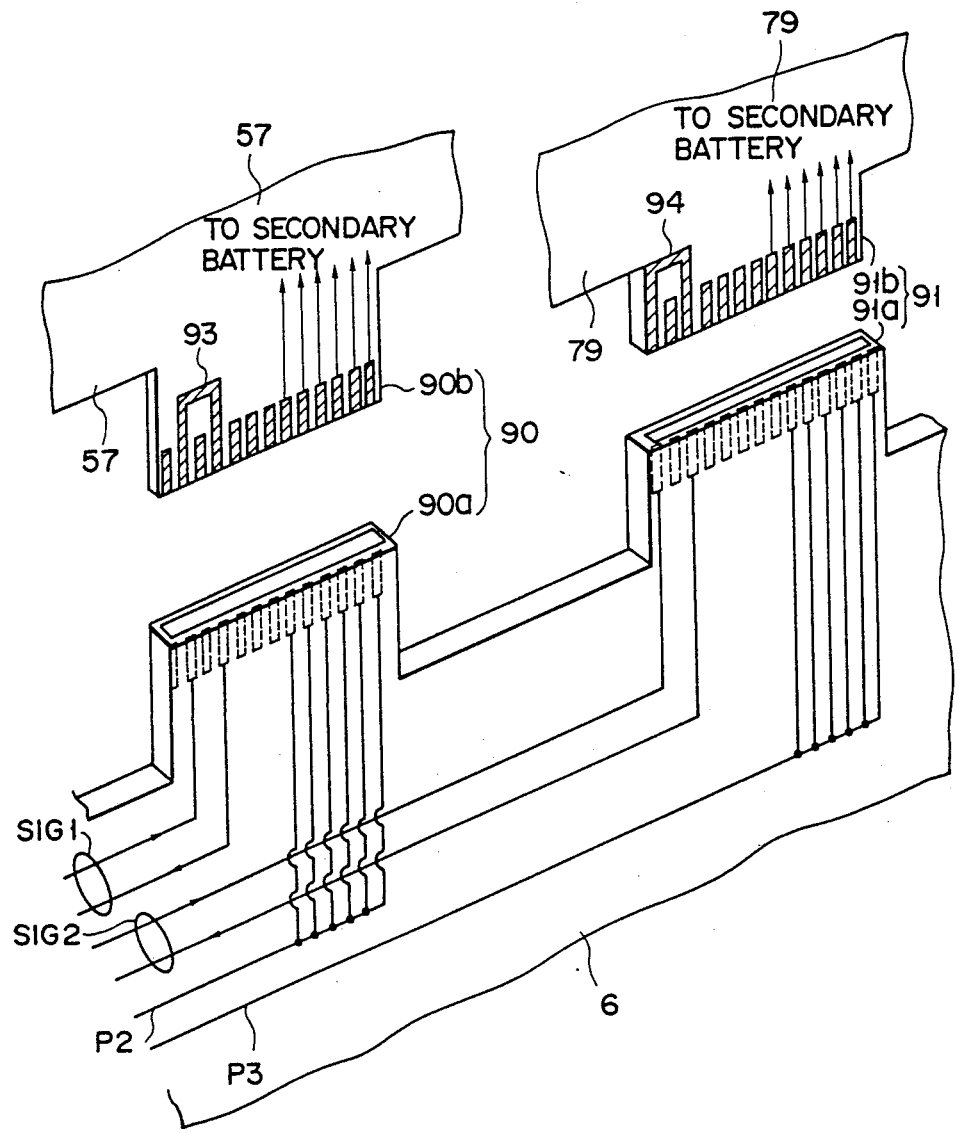
F I G. 11

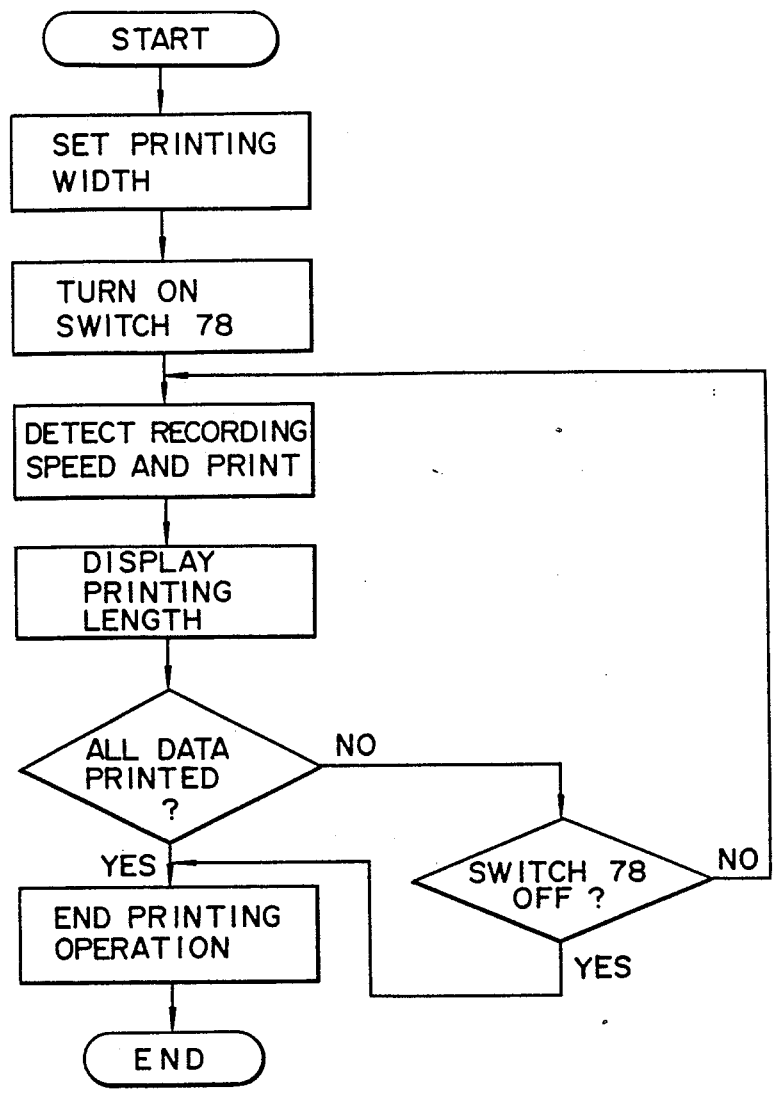
F I G. 15

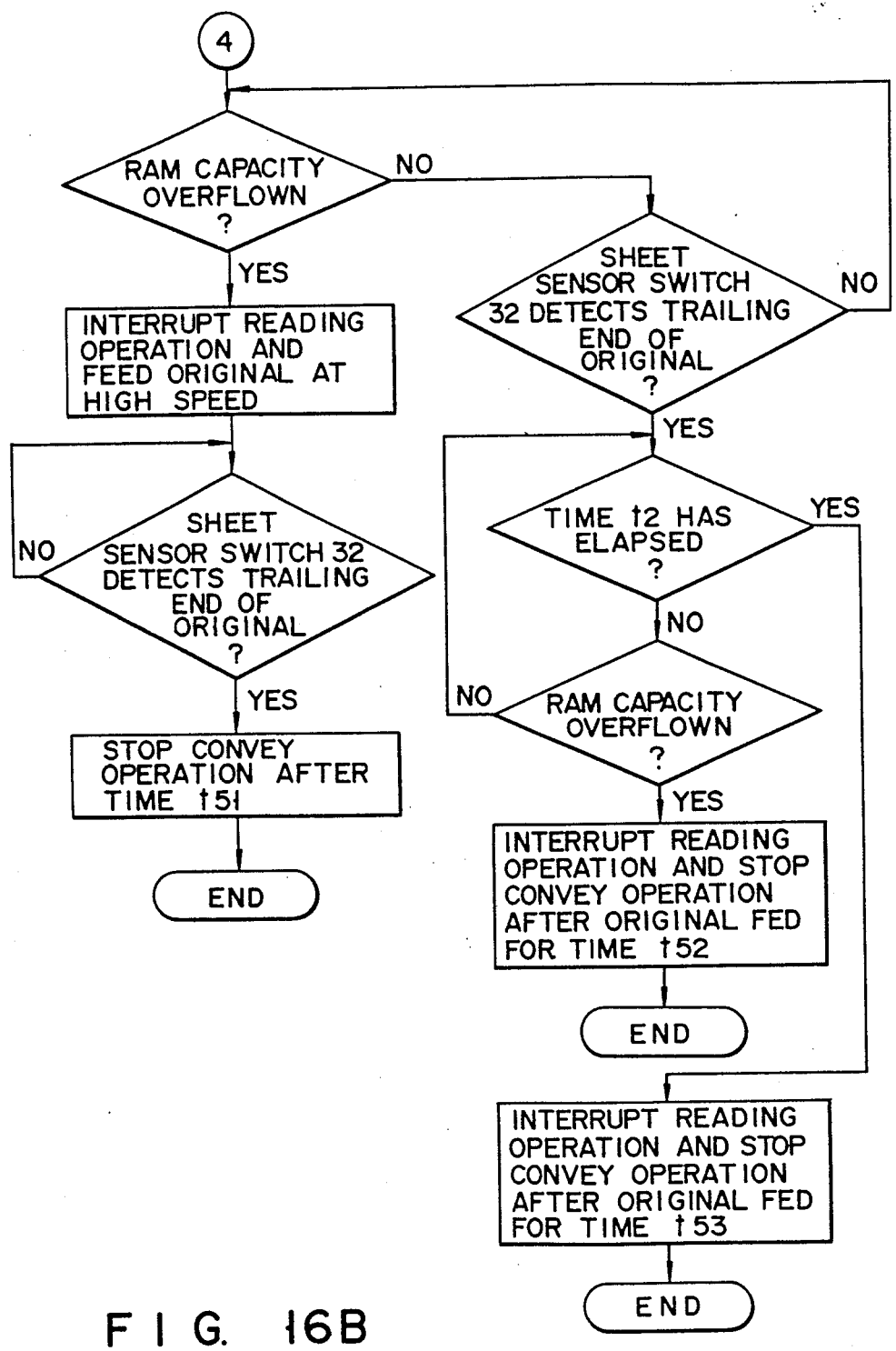
F I G. 16B

IMAGE READING BODY AND IMAGE FORMATION BODY DETACHABLY MOUNTED TO A CONTROL BODY

BACKGROUND OF THE INVENTION

1. Field of the Invention

The present invention relates to an image forming apparatus which is capable of manual scanning and reads an image of an original or document to form an image on an image forming medium.

2. Description of the Related Art

A handy copying machine for performing a reading or recording operation (image formation) by manual scanning, a scanner (image reading apparatus), serving as a terminal of, e.g., a word processor or a personal computer, to read an image by a manual scanning operation, and a printer (image recording apparatus) for performing a recording operation, are conventionally known.

In the handy copying machine, the scanner, the printer (to be referred to as an "image forming apparatus" hereinafter), or the like, an image can be easily read from three-dimensional objects such as a book or a magazine, and can also be easily recorded on three-dimensional objects such as a notebook. On the contrary, a reading operation from a sheet of original, or a recording operation on a sheet of recording sheet must be performed manually, thus degrading operability. On the other hand, in an image forming apparatus, applied to, e.g., a facsimile, for reading or recording an image by an automatic scanning operation while sheets are conveyed, the above-mentioned reading or recording operation of three-dimensional objects cannot be performed. Therefore, operability is undesirably degraded.

SUMMARY OF THE INVENTION

It is an object of the present invention to provide an image forming apparatus with excellent operability, which allows not only an easy reading operation of an image from three-dimensional objects such as a book or a magazine, and an easy recording operations on three-dimensional objects such as a notebook, but also a reading operation of a sheet of original and a recording operation on a sheet of recording paper by manual or automatic scanning while sheets are conveyed, the reading and recording operations being independently performed.

BRIEF DESCRIPTION OF THE DRAWINGS

FIGS. 1 to 17 show an embodiment of the present invention, in which:

FIG. 1 is a perspective view showing a control unit, and image reading and recording units which are detached from the control unit;

FIG. 2 is a perspective view showing the control unit on which the image reading and recording units are mounted;

FIG. 3 is a view showing an arrangement of an opeartion panel;

FIGS. 4A to 4C are views showing the control unit, in which FIG. 4A is a rear view, FIG. 4B is a plan view, and FIG. 4C is a side view;

FIG. 5 is a view for explaining an operation to separate a thermal head from a platen roller;

FIG. 6 is a view for explaining an operation for bringing the thermal head into contact with the platen roller;

FIGS. 7A to 7C are views showing an arrangement of the image reading unit, in which FIG. 7A is a plan view, FIG. 7B is a front view, and FIG. 7C is a side view;

FIGS. 8A to 8G are views showing an arrangement of the image recording unit, in which FIG. 8A is a rear view, FIG. 8B is a plan view, FIG. 8C is a front view, FIGS. 8D and 8E are side views when viewed from different sides, respectively, FIG. 8F is a bottom view, and FIG. 8G is a plan view of a section along a ribbon cassette;

FIG. 9 is a perspective view of the disassembled image recording unit;

FIG. 11 is a view for explaining a coupled state of the control unit, the image reading unit, and the image recording unit; and FIGS. 12A to 17B are flow charts for explaining an operation.

DETAILED DESCRIPTION OF THE PREFERRED EMBODIMENT

An embodiment of the present invention will be described hereinafter with reference to the accompanying drawings.

Figure 1:
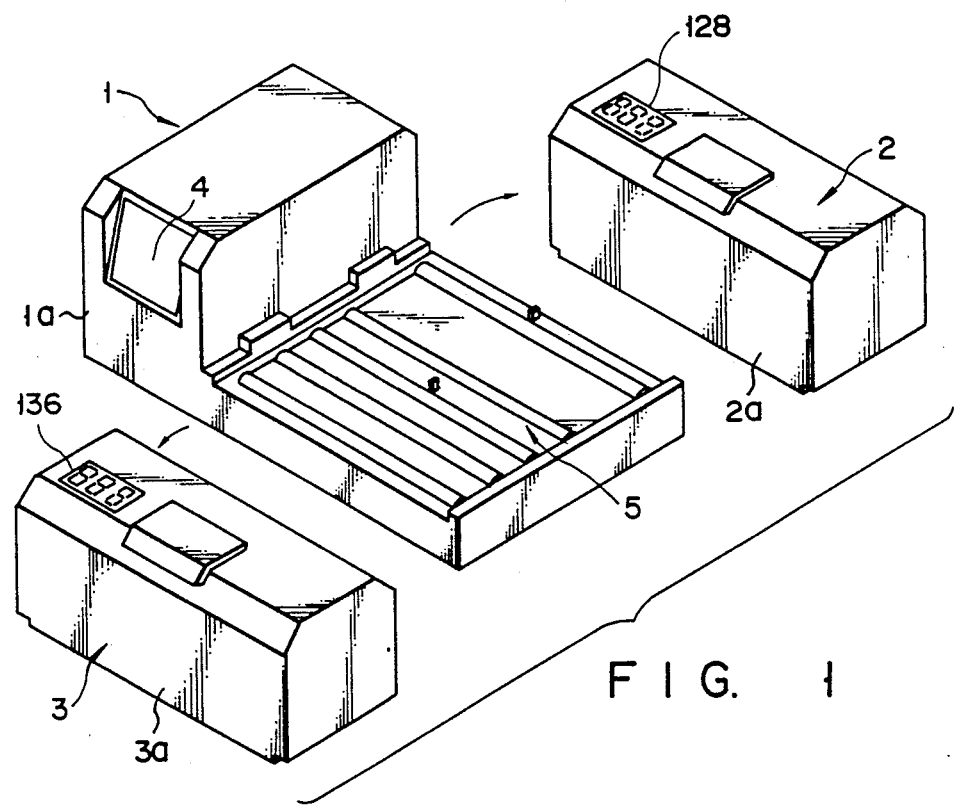
Figure 2:
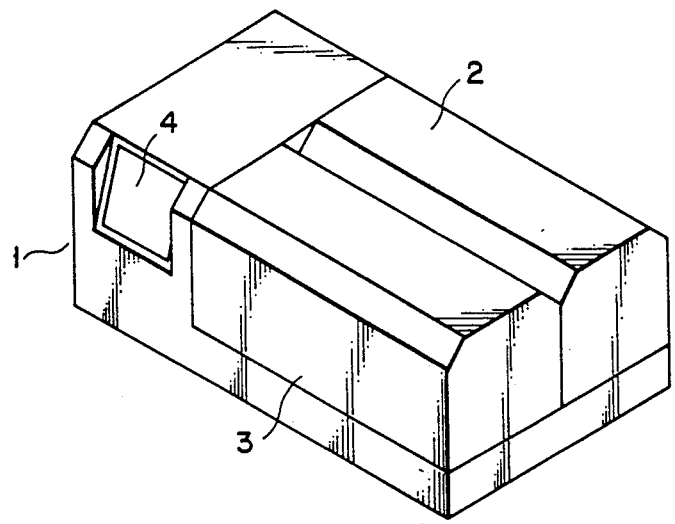

FIG. 1 is a perspective view showing an outer appearance of an image forming apparatus according to the present invention. Referring to FIG. 1, reference numeral 1 denotes a control unit (conveying means). The control unit 1 includes a convey mechanism for conveying an original and a recording sheet as a medium on which an image is formed, and a control circuit for controlling the entire apparatus. As shown in FIG. 1, image reading and recording units 2 and 3 are separated from the control unit 1. When the image reading and recording units 2 and 3 are placed on the control unit 1 as shown in FIG. 2, the original and/or the recording sheet can be automatically conveyed, and this apparatus serves as an image forming apparatus which can read an original and/or can perform a recording operation by an automatic scanning operation. The control unit 1 includes a housing 1a having a higher left side portion, and a right side portion with a flat upper surface. The image reading and recording units 2 and 3 respectively include elongated housings 2a and 3a each having a flat lower surface. The shapes of the housings 2a and 3a are substantially the same. This apparatus is designed to be compact when the housings 2a and 3a are placed together on the upper surface of the right side portion of the housing 1a of the control unit.

As shown in FIG. 1, the image reading unit (reading means) 2 and the image recording unit (image forming means) 3 are detachable from the control unit 1. Even if the image reading and recording units 2 and 3 are detached from the control unit 1, these units 2 and 3 can be independently operated to serve as image reading and recording apparatuses, respectively. Displays 128 and 136 are arranged on the upper surfaces of the image reading and recording units 2 and 3, respectively.

Figure 3:
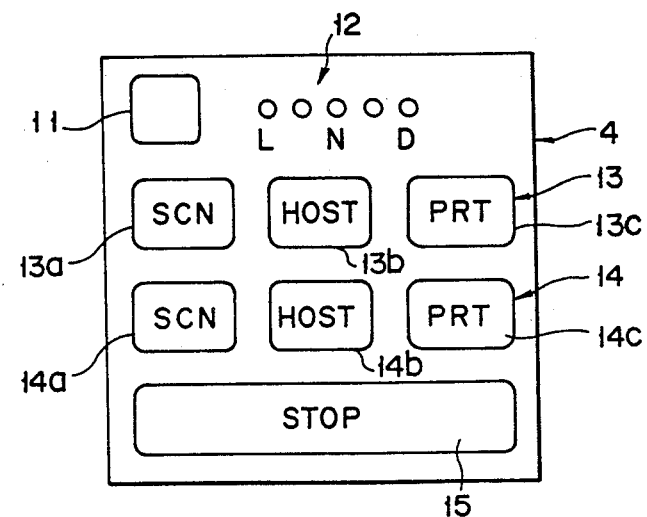

An operation panel 4 is arranged on the front surface of the left side portion. As shown in FIG. 3, a density selection key 11, a density display 12, a read data transfer key 13, a recording data transfer key 14, and a stop key 15 are arranged on the operation panel 4.

The density selection key 11 changes and sets an image density. Five LEDs which constitute the density display 12 are cyclically turned on, N (normal) - D (dark) - L (light) - N (normal), in the order named, upon every depressing operation of the density selection key 11 to display a selected density.

The read data selection key 13 is constituted by three types of keys, i.e., an SCN key 13a, a HOST key 13b, and a PRT key 13c. When the image reading and recording units 2 and 3 are mounted on the control unit 1, the read data selection key 13 designates a memory in which image data read by the image reading unit 2 is stored. More specifically, when the SCN key 13a is designated, a command is supplied to transfer the data to a RAM 123 (FIG. 10) arranged in the image reading unit 2. When the HOST key 13b is designated, a command is supplied to transfer the data to a RAM 102 (FIG. 10) arranged in the control unit 1. When the PRT key 13c is designated, a command is supplied to transfer the data to a RAM 131 (FIG. 10) arranged in the image recording unit 3.

The recording data selection key 14 is constituted by three types of keys, i.e., an SCN key 14a, a HOST key 14b, and a PRT key 14c. When the image reading and recording units 2 and 3 are mounted on the control unit 1, the recording data selection key 14 designates a supply source of image data to be recorded by the image recording unit 3. More specifically, when the SCN key 14a is designated, a command is supplied to select the RAM 123 arranged in the image reading unit 2 as a supply source of the image data. When the HOST key 14b is designated, a command is supplied to select the RAM 102 arranged in the control unit 1 as a supply source of the image data. When the PRT key 14c is designated, a command is supplied to select the RAM 131 arranged in the image recording unit 3 as a supply source of the image data.

The stop key 15 stops a reading or printing operation.

As shown in FIGS. 4A to 4C, the above-mentioned control unit 1 includes the operation panel 4, a sheet convey system 5, an electrical unit 6, and a power source unit 7.

As shown in FIG. 4B, the sheet convey system 5 includes a recording sheet convey system 21, corresponding to the image recording unit 3, for conveying recording sheets, and an original convey system 22, corresponding to the image reading unit 2, for conveying an original D.

The recording sheet convey system 21 includes two feed rollers 23 and 24, a platen roller 25, and a recording sheet convey motor 26 for rotating the above roller group. The feed rollers 23 and 24, and the platen roller 25 are respectively brought into contact with a pinch roller and a heat generation element portion of a thermal head (to be described later), which are exposed on the bottom surface of the image recording unit 3.

The two ends of a shaft of the feed roller 24 are pivotally supported by a pair of arms 27. The pair of arms 27 are pivotal about the pivotally supporting points of the shaft of the feed roller 24. The two ends of a shaft of the platen roller 25 are rotatably supported by ends of the pair of arms 27. An eccentric cam 28 is disposed on the lower side of each of the arms 27. The eccentric cam 28 is rotated by a cam motor 29.

Figure 5:
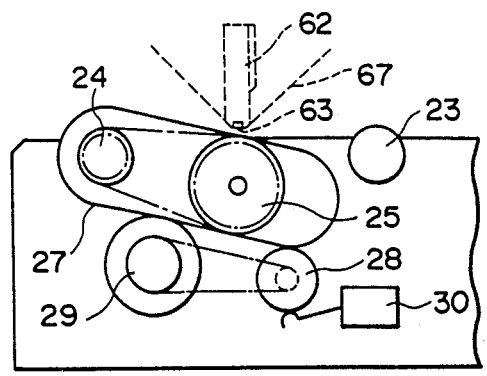
Figure 6:
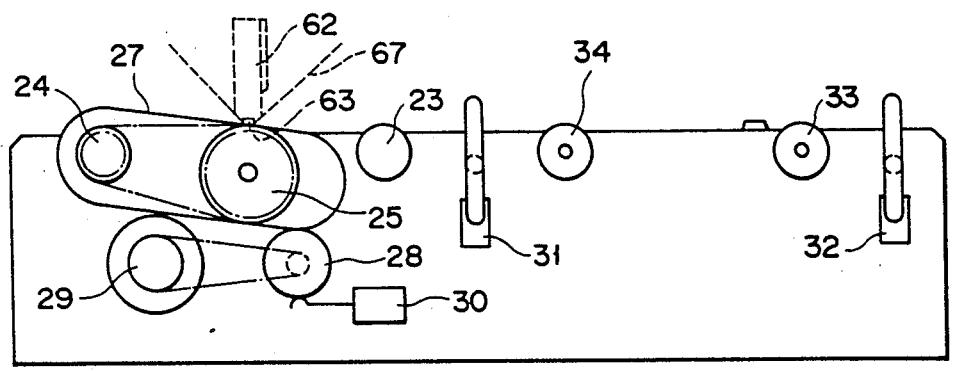

A rotation of the cam motor 29 is transmitted to the cams 28. When each cam 28 is rotated, the corresponding arm 27 is pivoted about the shaft of the feed roller 24. As shown in FIG. 6, when each cam 28 urges the corresponding arm 27 upward, the platen roller 25 is moved to an upper position, and the roller 25 is brought into contact with a heat generation element portion 63 of a thermal head 62 in the image recording unit 3 so as to sandwich an ink ribbon 67. On the other hand, when the cams 28 do not move the arms 27 upward, as shown in FIG. 5, the platen roller 25 is moved to a lower position, and is spaced apart from the heat generation element portion 63 of the thermal head 62.

The upper or lower position of the arms 27 is detected by a switch 30 arranged so that its contact element is brought into contact with the cam 28, and the detected data is supplied to a CPU 100 (FIG. 10) (to be described later). A sheet sensor switch 31 is arranged on the upstream side of a convey path for an original or a recording sheet near the feed roller 23, and a result detected by the sheet sensor switch 31 is also supplied to the CPU 100.

The original convey system 22 includes two feed rollers 33 and 34, and an original convey motor 35 for rotating the above roller group. The feed rollers 33 and 34 are disposed to be brought into contact with pinch rollers (to be described later) exposed on the bottom surface of the image reading unit 3. A sheet sensor switch 32 is arranged on the upstream side of the convey path for the original or the recording sheet near the feed roller 33, and a result detected by the sheet sensor switch 32 is also supplied to the CPU 100.

The above-mentioned electrical unit 6 is arranged under the feed rollers 23, 24, 33, and 34, and the platen roller 25. The electrical unit 6 includes a substrate on which a control circuit for controlling the control unit 1, a RAM for storing image data, and the like are mounted. This electric circuit will be described later in detail.

The power source unit 7 is constituted by a charger 36 for converting an externally supplied power source voltage of, e.g., 100 V into a DC voltage of, e.g., 12 V, used in the apparatus, and for outputting the resultant DC voltage, and a secondary battery 37 for storing electric power. The charger 36 charges not only the secondary battery 37 arranged in the control unit 1, but also secondary batteries 58 and 80 (FIG. 10) respectively arranged in the image reading and recording units 2 and 3. The secondary battery 37 supplies a power source voltage to each electric circuit in the control unit 1.

FIGS. 7A to 7C show an arrangement of the image reading unit 2. Referring to FIGS. 7A to 7C, reference numerals 40 and 41 denote pinch rollers. The pinch rollers 40 and 41 are exposed from the bottom surface of the image reading unit 2. Since the pinch rollers 40 and 41 are exposed, they are rotated by friction with an original when the original manually placed on a flat surface is scanned. On the other hand, when the image reading unit 2 is mounted on the original convey system 22 in the control unit 1, and the original or document D is automatically conveyed, the pinch rollers 40 and 41 respectively contact the feed rollers 33 and 34 in the control unit 1 to convey the original fed between the control unit 1 and the image reading unit 2.

The image reading unit 2 further includes an optical system consisting of, e.g., a xenon lamp 42 for illuminating an original, mirrors 44, 45, 46, and 47 for sequentially guiding reflected beams from the original to which a light beam is radiated by the xenon lamp 42, and a lens 48 for focusing the beams guide by the mirrors 44, 45, 46, and 47 to form an image on a CCD sensor 49 serving as a photoelectric conversion element; and an inverter 50 for turning on the xenon lamp 42.

The reflected light from the original D to which the light beam is radiated by the xenon lamp 42 is reflected by the mirrors 44, 45, 46, and 47, in the order named, and is guided to the lens 48. The guided beams are focused by the lens 48 to form an image on the CCD sensor 49. The focused beams are photoelectrically converted by the CCD sensor 49, and are stored in the RAM designated by the operation panel 4, as image data.

When the reading operation by the image reading unit 2 is performed by a manual scanning operation, a moving speed in a sub-scanning direction (a direction perpendicular to the longitudinal direction of the xenon lamp 42) is not often constant. Therefore, the number of revolutions is detected by a rotary encoder 51, and hence a moving speed in the sub-scanning direction is measured. A timing to the CCD sensor 49 is automatically controlled so that a reading resolution in the sub-scanning direction is constant.

The display 128 is arranged on the upper surface of the image reading unit 2. The display 128 is constituted by arranging, e.g., three 7-segment LEDs. The display 128 can display a number of three digits (FIG. 1). When the image reading unit 2 independently reads an original, the display 128 displays a relative moving distance between the original and the image reading unit 2. More specifically, the number of revolutions of the pinch roller 40 is detected by the rotary encoder 51, and a moving distance in the sub-scanning direction is calculated by a CPU 126 using the detected number of revolutions. The calculated moving distance is displayed on the display 128. When an operator monitors a number displayed on the display 128, he or she can know a remaining distance in the sub-scanning direction which can be read, i.e., a remaining capacity of the RAM 123.

A slide volume 53 with a lever 52 is disposed on a side surface of the image reading unit 2 to set a reading width. The reading width is also set using the slide volume 53 when the image reading and recording units 2 and 3 are mounted on the control unit 1 to perform a reading or recording operation while an original D or a recording sheet P is automatically conveyed. In this case, both the reading and recording widths are set by the slide volume 53.

A switch plate 54 is arranged on the housing 2a to be pivoted about a shaft 55. When the switch plate 54 is urged, a switch 56 is turned on.

When the image reading unit 2 is mounted on the control unit 1 to read image data while the original is automatically conveyed, the switch 56 serves as a switch for starting a reading operation. When the image reading unit 2 is detached from the control unit 1, and an image of the original is read by manual scanning, the switch 56 is used to supply a reading period. In other words, while the switch 56 is ON, a reading operation is performed. The reading operation will be described hereinafter in detail. Reference numeral 57 denotes an electrical unit to be mounted on the image reading 2; and 58, the secondary battery for supplying a power source voltage to the electrical unit 57.

FIGS. 8A to 8F, and FIG. 9 show an arrangement of the image recording unit 3. Reference numerals 60 and 61 denote pinch rollers. The pinch rollers 60 and 61 are partially exposed from the bottom surface of the image recording unit 3. These pinch rollers 60 and 61 are rotatably supported in the housing 3a. When a printing operation onto a recording sheet P manually placed on a flat surface is performed, the housing 3a is moved on and along the recording sheet P, and hence is rotated by friction with the sheet P. On the other hand, when the image recording unit 3 is mounted on the recording sheet convey system 21 in the control unit 1, and the recording sheet P is automatically conveyed, the pinch rollers 60 and 61 are respectively brought into contact with the feed rollers 23 and 24 in the control unit 1, and the recording sheet P fed between the control unit 1 and the image recording unit 3 is conveyed by these rollers.

Figure 8A:
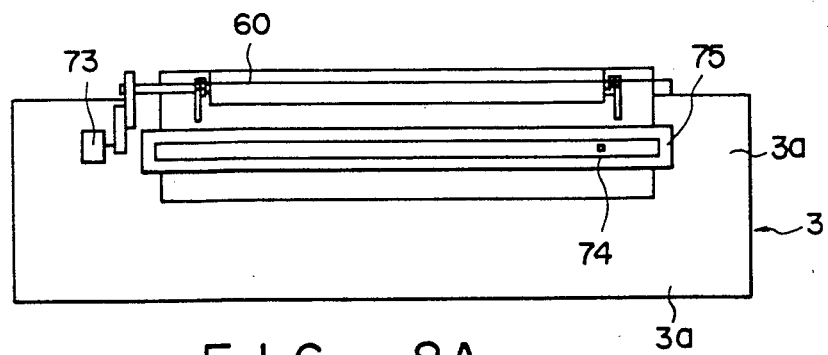
Figure 8B:
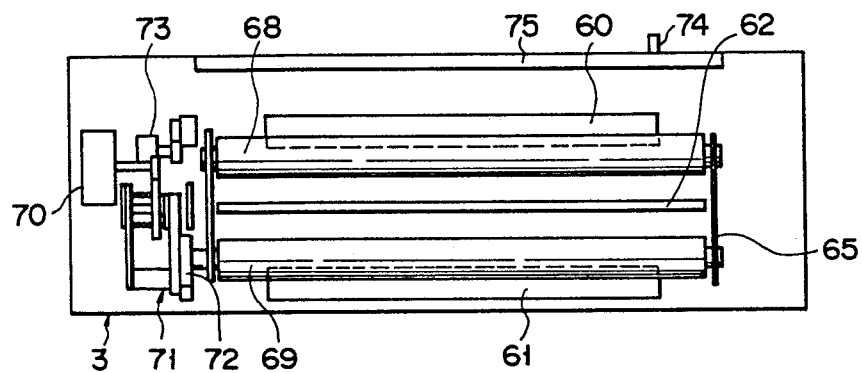
Figure 8C:
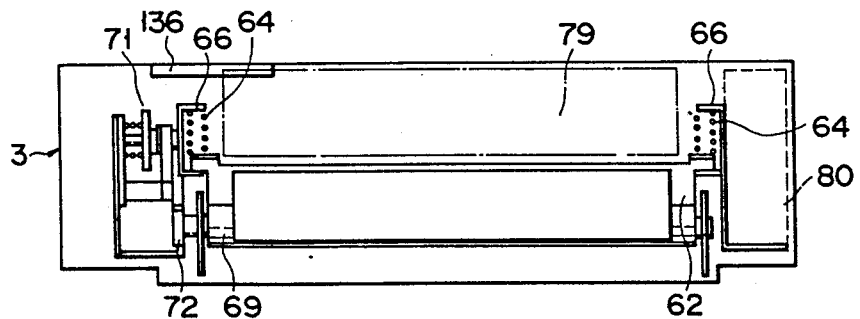
Figure 8D:
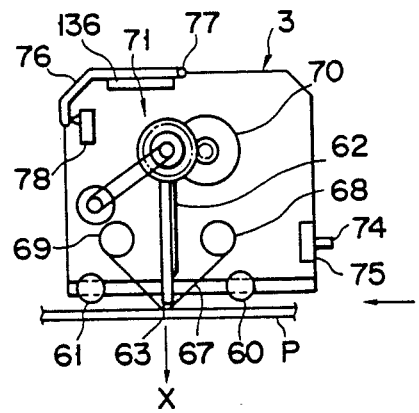
Figure 8E:
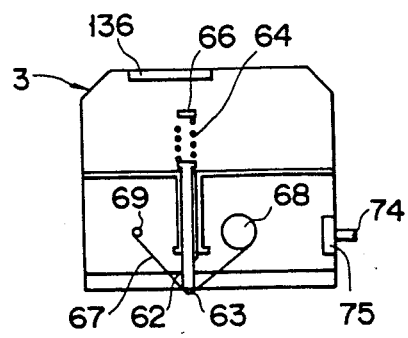
Figure 8F:
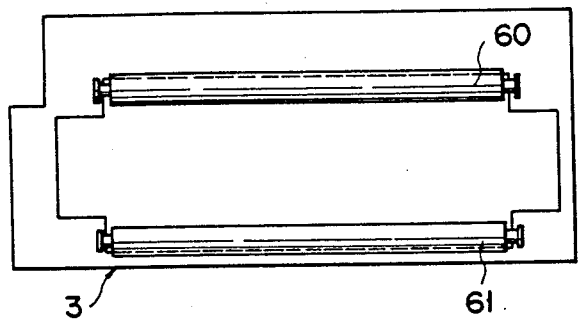
Figure 8G:
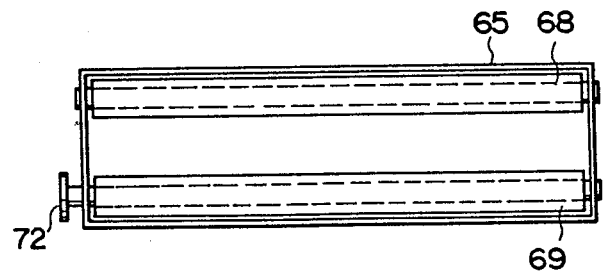

In FIG. 8D, the thermal head 62 is urged in a direction (downward) indicated by an arrow X by a spring 64 arranged between the thermal head 62 and an upper arm of a U-shaped bracket 66, and an upper flange abuts against a lower arm of the bracket 66. Therefore, a downward moving range of the thermal head 62 is restricted. The heat generation element portion 63 arranged at the lower end of the thermal head 62 is urged against the recording sheet P by an urging force of the spring 64. Since the downward moving range of the thermal head 62 is restricted by the bracket 66, the heat generation element portion 63 of the thermal head 62 is spaced apart from the platen roller 25 when the platen roller 25 of the recording sheet convey system 21 is moved downward. In an initialization state, the ink ribbon 67 is wound around a supply core 68 rotatably contained in an ink ribbon cassette 65. During a printing operation, the ink ribbon 67 is taken up around a take-up core 69 rotatably arranged in the cassette 65 at a speed which is equal to the relative moving speed between the recording sheet P and the thermal head 62. When a rotation is transmitted to a gear 72 disposed at an end portion of the take-up core 69 from an ink ribbon take-up motor 70 serving as a drive source through an ink ribbon take-up drive unit 71, the take-up core 69 is rotated and driven.

The ink ribbon take-up motor 70 is rotated and driven to take up the ink ribbon 67 at a speed higher than the relative moving speed between the recording sheet P and the thermal head 62. Therefore, when a predetermined tension or more is applied on the ink ribbon 67 by a slip clutch mechanism arranged in the ink ribbon take-up drive unit 71, the take-up core 69 slips, and a moving speed of the ink ribbon 67 is kept constant. The ink ribbon take-up motor 70 is stopped not to take up the ink ribbon 67 during an image reading operation while the image reading and recording units 2 and 3 are mounted on the control unit 1 to read the original D.

A rotary encoder (detecting means) 73 is rotated in accordance with a rotation speed of the pinch roller 60. When the rotation speed of the pinch roller 60 is detected by the rotary encoder 73, a moving speed in the sub-scanning direction of the image recording unit 3, i.e., a relative moving speed between the recording sheet P and the thermal head 62 is calculated to control a printing timing of the thermal head 62 so that a printing resolution of the thermal head 62 is kept constant. The number of revolutions of the ink ribbon take-up motor 70 is detected by the rotary encoder 73, and is controlled so that the take-up speed of the ink ribbon 67 is higher than the relative moving speed between the recording sheet P and the thermal head 62.

The display (displaying means) 136 is arranged on the upper surface of the housing of the image reading unit 2. This display 136 is constituted by arranging, e.g., three 7-segment LEDs, and can display a number of three digits (FIG. 1). When the image recording unit 3 independently records an image on the recording sheet P, the display 136 displays a relative moving distance between the recording sheet P and the image recording unit 3. More specifically, the number of revolutions of the pinch roller 60 is detected by the rotary encoder 73, and a moving distance in a sub-scanning direction is calculated by a CPU 134 in accordance with the detected number of revolutions. The calculated moving distance is displayed on the display 136. When an operator monitors a number displayed on the display 136, he or she can know a remaining distance in the sub-scanning direction to be recorded, i.e., a remaining capacity of image data left in the RAM 123. A slide volume 75 to which a lever 74 is slidably disposed is arranged on a side surface of the housing of the image recording unit 3, and extends in the widthwise direction. The slide volume 75 sets a recording width. When the image reading and recording units 2 and 3 are mounted on the control unit 1 to perform reading and recording operations while the original D or the recording sheet P is automatically conveyed, the slide volume 75 is not used. In this case, the slide volume 53 arranged in the image reading unit 2 located on the upstream side with respect to a convey direction of the original D or the recording sheet P is used. In this case, both the reading and recording widths are set by the slide volume 53.

A switch plate 76 is axially supported by the housing to be pivoted about a shaft 77. When the switch plate 76 is urged and pivoted, a switch 78 is turned on.

Figure 9:
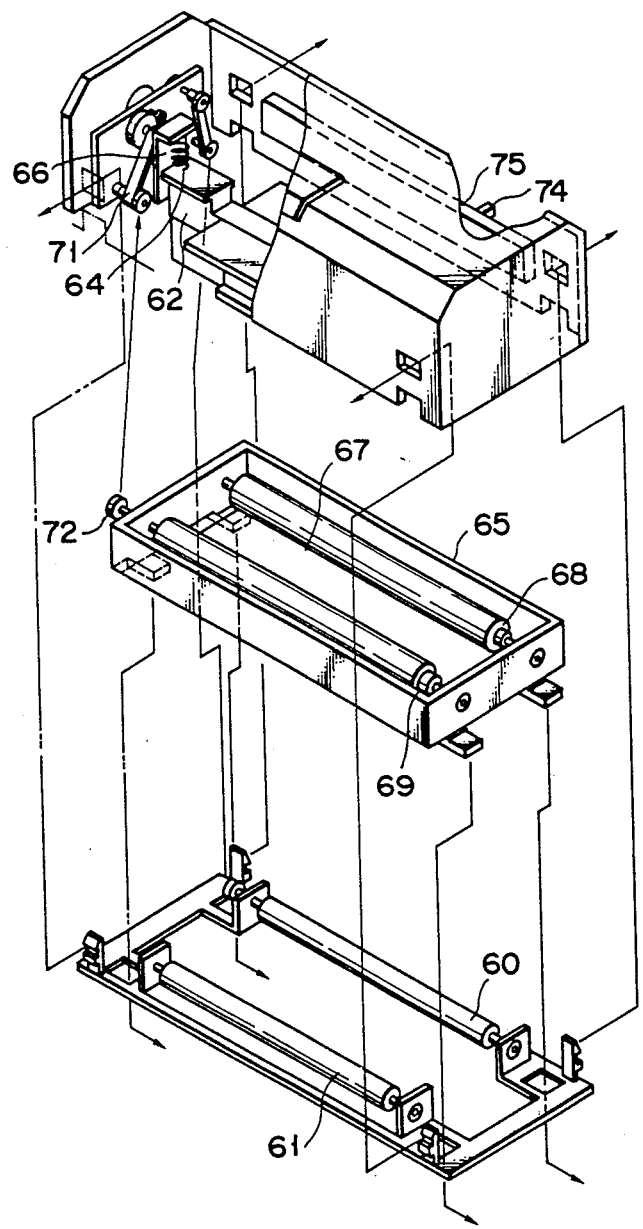

When the image recording unit 3 is mounted on the control unit 1 to record image data while the recording sheet P is automatically conveyed, the switch 78 serves as a switch for starting a recording operation. When the image recording unit 3 is detached from the control unit 1 to record the image data by manual scanning, the switch 78 is used to supply a recording period. In other words, while the switch 78 is ON, the recording operation is performed. This recording operation will be described later in detail. In FIG. 9, reference numeral 79 denotes an electrical unit to be mounted on the image recording unit 3; and 80, the secondary battery for supplying a power source voltage to the electrical unit 79.

Figure 10A:
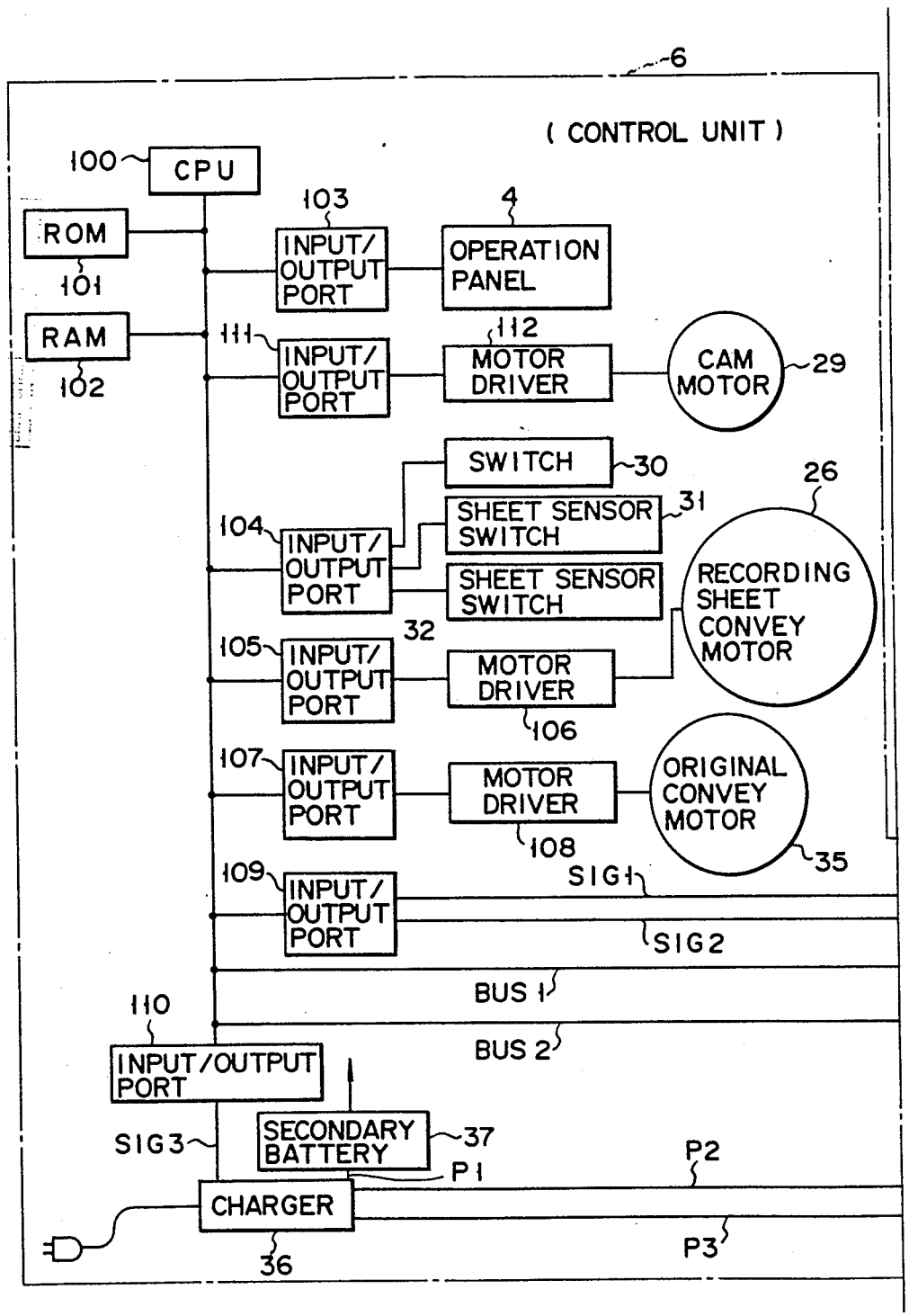
FIGS. 10A and 10B are block diagrams of an electric circuit.
Figure 10B:
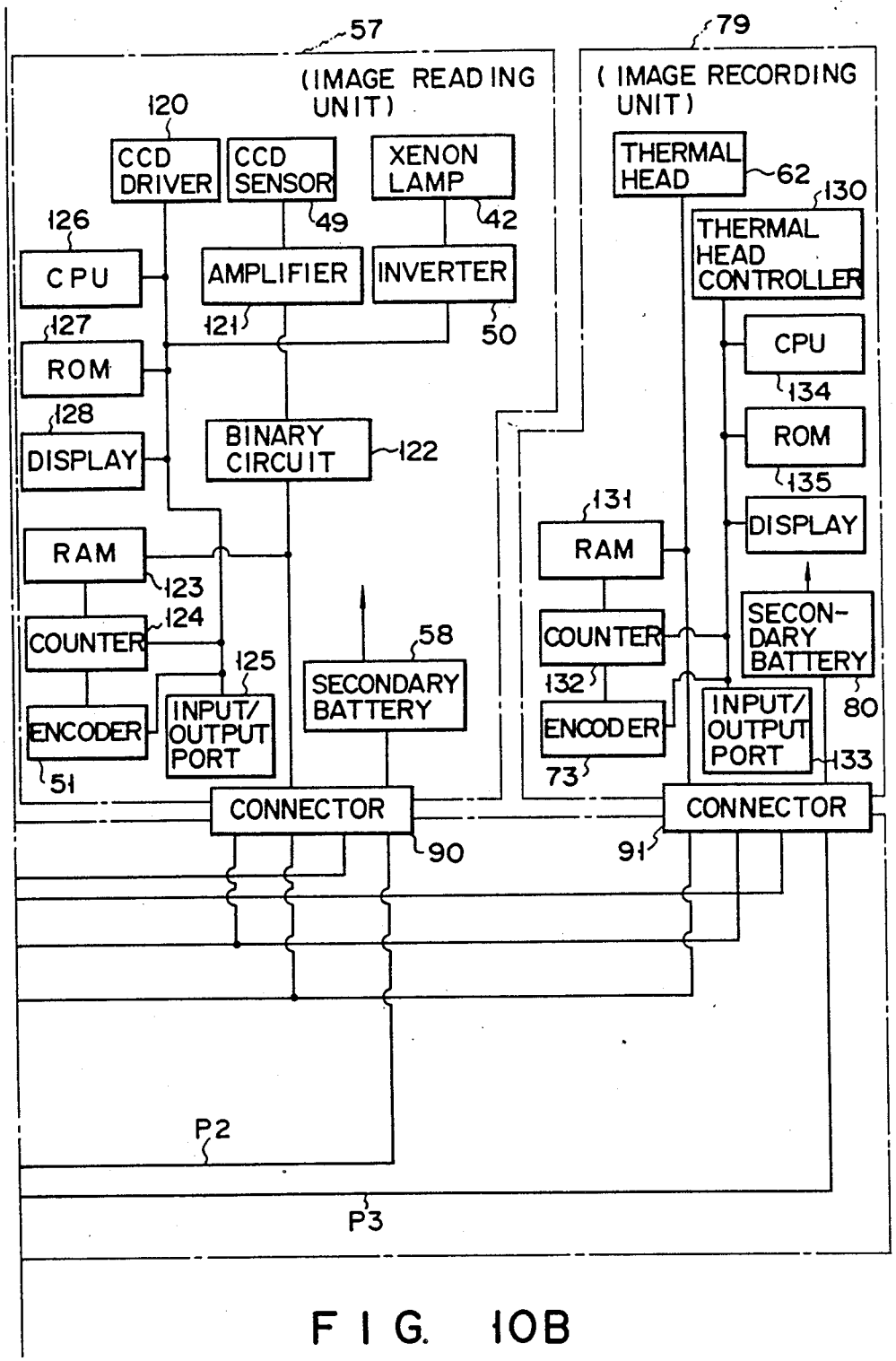

FIGS. 10A and 10B are block diagrams showing an arrangement of the entire electric circuit of the image forming apparatus. This image forming apparatus is constituted by the electric circuit of the electrical unit 6 in the control unit 1, the electric circuit of the electrical unit 57 in the image reading unit 2, and the electric circuit of the electrical unit 79 in the image recording unit 3. The control unit 1, the image reading unit 2, and the image recording unit 3 are electrically connected to each other by connectors 90 and 91.

The electrical unit 6 in the control unit 1 is arranged as follows. The CPU 100 controls the entire apparatus. A ROM 101 is a read-only memory for storing a control program for operating the CPU 100, and fixed data required for other processing. A RAM 102 stores image data read by the image reading unit 2 when the HOST key 14b in the recording data selection key 14 on the operation panel 4 is turned on and selected. When the HOST key 14b in the recording data selection key 14 on the operation panel 4 is turned on and selected, the image data of the RAM 102 is supplied to the image recording unit 3, and is used to form an image. The RAM 102 is also used as a buffer for operation of the CPU 100.

An input/output port 103 controls data exchange between the above-mentioned members and the operation panel 4. An input/output port 104 supplies a detection signal from the switch 30 and the sheet sensor switches 31 and 32 to the CPU 100. An input/output port 105 supplies a drive signal from the CPU 100 to a motor driver 106 for driving the recording sheet convey motor 26. Similarly, an input/output port 107 supplies a drive signal from the CPU 100 to a motor driver 108 for driving the original convey motor 35. Also, an input/output port 111 supplies a drive signal from the CPU 100 to a motor driver 112 for driving the cam motor 29.

An input/output port 109 supplies an image reading unit detection signal SIG1 representing whether the image reading unit 2 is connected to the control unit 1, and an image recording unit detection signal SIG2 representing whether the image recording unit 3 is connected to the control unit 1, to the CPU 100 through connecting lines. The presence/absence of this connection can be detected by a connecting means shown in FIG. 11. This means includes two sockets 90a and 91a arranged in the control unit 1, a plug 90b which is arranged in the image reading unit 2 and can be connected to one socket 90a, and a plug 91b which is arranged in the image recording unit 3 and can be connected to the other socket 91a. SIG1 and SIG2 connecting lines from the input/output port 109 respectively consist of transmission and receiving lines, and are connected to open terminals arranged in the sockets 90a and 91a, respectively. Closed terminals are arranged to correspond to the open terminals in the plugs 90b and 91b, respectively. When the plugs 90b and 91b are respectively connected to the sockets 90a and 91a, the transmission and receiving closed terminals are connected to the closed terminals of the plugs, respectively. As a result, the transmission and receiving lines are connected to each other through the closed terminals. With such an arrangement, it is detected whether the image reading and recording units 2 and 3 are connected to the control unit 1 in accordance with whether the detection signal supplied from the input/output port 109 returns. More specifically, for example, if the image reading unit 2 is not connected to the control unit 1, the supplied signal does not return because the signal line is open at the connector 90. If the image reading unit 2 is connected to the control unit 1, the supplied detection signal returns through a connecting terminal 93 arranged at an end portion of the substrate which constitutes the electrical unit 57 of the image reading unit 2. Therefore, when this detection signal is monitored, the presence/absence of the connection can be known. The presence/absence of connection of the image recording unit 3 can be similarly detected.

An input/output port 110 is connected between the CPU 100 and the charger 36 to supply a secondary battery supply control signal SIG3 to the charger 36. The secondary battery supply control signal SIG3 designates whether the secondary battery 37, 58, or 80, respectively mounted on the control unit 1, the image reading unit 2, and the image recording unit 3 is charged. In response to the secondary battery supply control signal SIG3, the charger 36 supplies electric power to the designated secondary battery 37, 58, or 80 through a power source supply line P1, P2, or P3, and charges the designated battery.

The transmitting/receiving operation of the control signal among the control unit 1, the image reading unit 2, and the image recording unit 3 is performed through a control signal bus BUS1, and the transmitting/receiving operation of the image data among these units is performed through an image signal bus BUS2. The power source supply lines P2 and P3, and the signal buses BUS1 and BUS2 connect the control unit 1, the image reading unit 2, and the image recording unit 3 to each other through the connectors 90 and 91.

The electric circuit of the image reading unit 2 has the following arrangement. The CPU 126 controls the entire image reading unit 2. A ROM 127 is a read-only memory for storing a control program for operating the CPU 126, and fixed data required for other processing. The display 128 displays a relative moving distance between the original D and the image reading unit 2. The RAM 123 stores image data read by the image reading unit 2 when the SCN key 13a in the read data selection key 13 on the operation panel 4 is turned on and the image reading unit 2 is selected. When the SCN key 14a in the recording data selection key 14 of the operation panel 4 is turned on and the image reading unit 2 is selected, the image data of the RAM 123 is supplied to the image recording unit 3 and is used to form an image. When the image reading unit 2 is independently operated (to be referred to as a "manual operation" hereinafter), the inverter 50 is driven by turning on the abovementioned switch 56. When the image reading unit 2 is mounted on the control unit 1 and is used (to be referred to as an "automatic operation" hereinafter), the inverter 50 is driven in response to a control signal supplied from the control signal bus BUS1 through an input/output port 125. Therefore, the xenon lamp 42 is turned on. During a manual operation, in response to a relative moving speed signal between the original D and the image reading unit 2, which is detected by the rotary encoder 51, the CPU 126 drives a CCD driver 120 in accordance with the speed signal, so that the CCD sensor 49 starts photoelectric conversion. During an automatic operation, in accordance with the control signal from the control signal bus BUS1, the CPU 126 drives the CCD driver 120 in accordance with a predetermined speed signal, so that the CCD sensor 49 starts photoelectric conversion. This photoelectrically converted image signal is amplified by an amplifier 121 with a predetermined gain, and the amplified signal is supplied to a binary circuit 122. The signal is simply binarized into binary data, i.e., black and white pixel data by the binary circuit 122. When the SCN key 13a in the read data selection key 13 on the operation panel 4 is turned on and the image reading unit 2 is selected, the binary data are sequentially stored in the RAM 123. Note that when the HOST key 13b in the read data selection key 13 is turned on and the control unit 1 is selected, the data are stored in the RAM 102 through the input/output port 125 and the image signal bus BUS2. When the PRT key 13c in the read data selection key 13 is turned on and the image recording unit 3 is selected, the data are stored in a RAM 131 through the input/output port 125 and the image signal bus BUS2. A memory address of the RAM 123 is supplied by a counter 124. During a manual operation, the counter 124 is incremented in accordance with the relative moving speed between the original D and the image reading unit 2, which is detected by the rotary encoder 51. During an automatic operation, the counter 124 is incremented in response to the control signal from the CPU 126, and the image data from the CCD sensor 49 are sequentially written in the RAM 123 in synchronism with the increment operation.

The electric circuit of the image recording unit 3 has the following arrangement. The CPU 134 controls the entire image recording unit 3. A ROM 135 is a read-only memory for storing a control program for operating the CPU 134, and fixed data required for other processing. The display 136 displays a relative moving distance between the recording sheet P and the image recording unit 3. When the PRT key 13c in the read data selection key 13 on the operation panel 4 is turned on and the image recording unit 3 is selected, the RAM 131 stores image data read by the image reading unit 2. When the PRT key 14c in the recording data selection key 14 on the operation panel 4 is turned on and the image recording unit 3 is selected, an image is formed in accordance with the image data of the RAM 131. When the image recording unit 3 is independently operated (to be referred to as a "manual operation" hereinafter), this unit 3 drives the CPU 134 by turning on the abovementioned switch 78, and an operation is started. When the image recording unit 3 is mounted on the control unit 1 and is used (to be referred to as an "automatic operation" hereinafter), the CPU 134 is driven in response to a control signal supplied from the control signal bus BUS1 through an input/output port 133, and an operation is started. During the manual operation, in response to the relative moving speed signal between the recording sheet P and the thermal head 62, which is detected by a rotary encoder 73, the CPU 134 generates an operation timing in accordance with the speed signal. During the automatic operation, in response to the control signal from the control signal bus BUS1, the CPU 134 generates a predetermined operation timing. These timings are supplied to a thermal head controller 130 to drive it. More specifically, in response to a control signal from the thermal head controller 130, the image data read out from the RAM 131, or image data supplied from the image signal bus BUS2 are sequentially supplied to the thermal head 62, and the heat generation element portion 63 of the thermal head 62 is selectively heated in accordance with the supplied image data. A reading address of the RAM 131 is supplied by a counter 132. During the manual operation, the counter 132 is incremented in accordance with a relative moving speed between the recording sheet P and the thermal head 62, which is detected by the rotary encoder 73. During the automatic operation, the counter is incremented in response to the control signal from the CPU 134. An image is formed in accordance with the image data supplied in synchronism with these increment operations.

Prior to forming the image, when the HOST key 14b of the recording data selection key 14 on the operation panel 4 is turned on, the image data of the RAM 102 in the control unit 1 is transferred to the image recording unit 3 through an input/output port 133, the image signal bus BUS2, and the connector 91, and is used to form an image. Similarly, when the SCN key 14a is turned on, the image data of the RAM 123 in the image reading unit 2 is transferred to the image recording unit 3 through the input/output port 133, the image signal bus BUS2, and the connector 91, and is used to form an image. When the PRT key 14c of the recording data selection key 14 is turned on, the image data of the RAM 131 in the image recording unit 3 is used to form an image. Note that the electric circuit of the image recording unit 3 includes, e.g., a driver (not shown) for the ink ribbon take-up motor 70.

An operation of the above arrangement will be described hereinafter.

This image forming apparatus has the following six basic modes.

(1) While the image reading and recording units 2 and 3 are mounted on the control unit 1, the original D is read.

(2) While the image reading and recording units 2 and 3 are mounted on the control unit 1, an image is formed on the recording sheet P.

(3) The image reading unit 2 is detached from the control unit 1, and the image reading unit 2 independently reads the original D.

(4) The image recording unit 3 is detached from the control unit 1, and the image recording unit 3 independently records an image on the recording sheet P.

(5) While only the image reading unit 2 is mounted on the control unit 1, the original D is read.

(6) While only the image recording unit 3 is mounted on the control unit 1, an image is recorded on the recording sheet P.

Operations of the above basic modes will be described below with reference to flow charts in FIGS. 12 to 17, respectively.

Figure 12A:
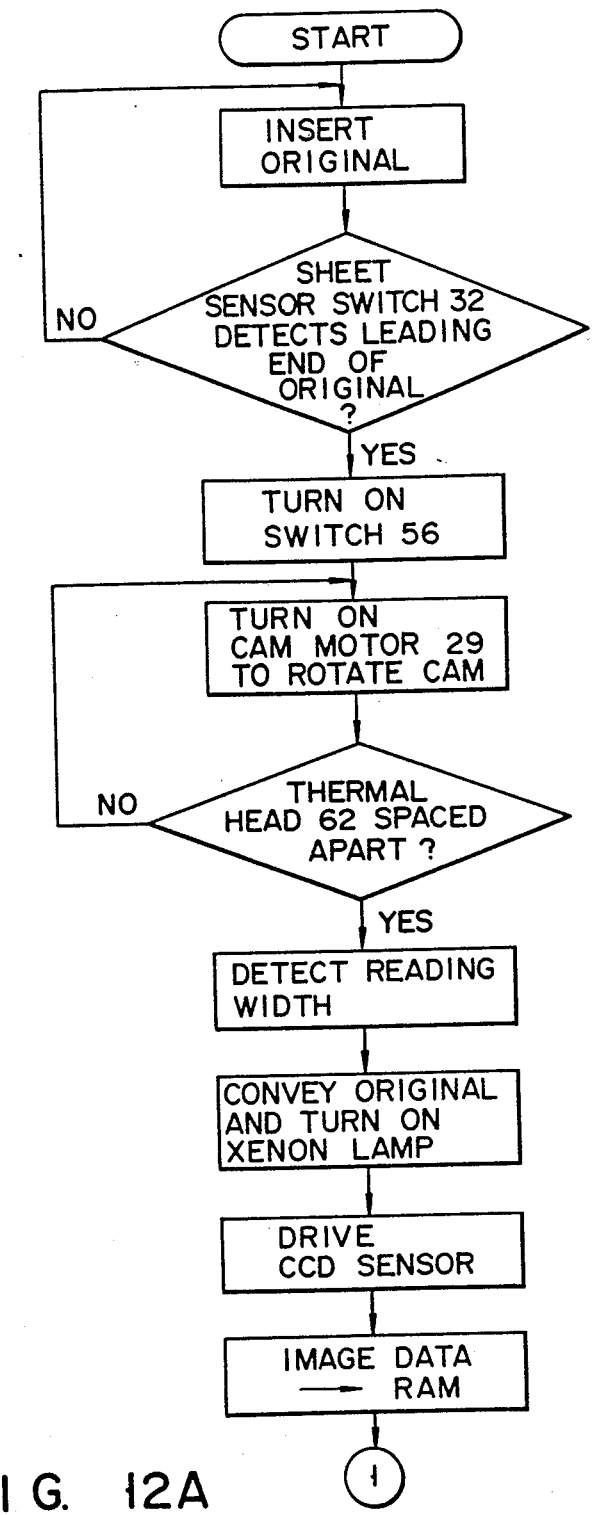
Figure 12B:
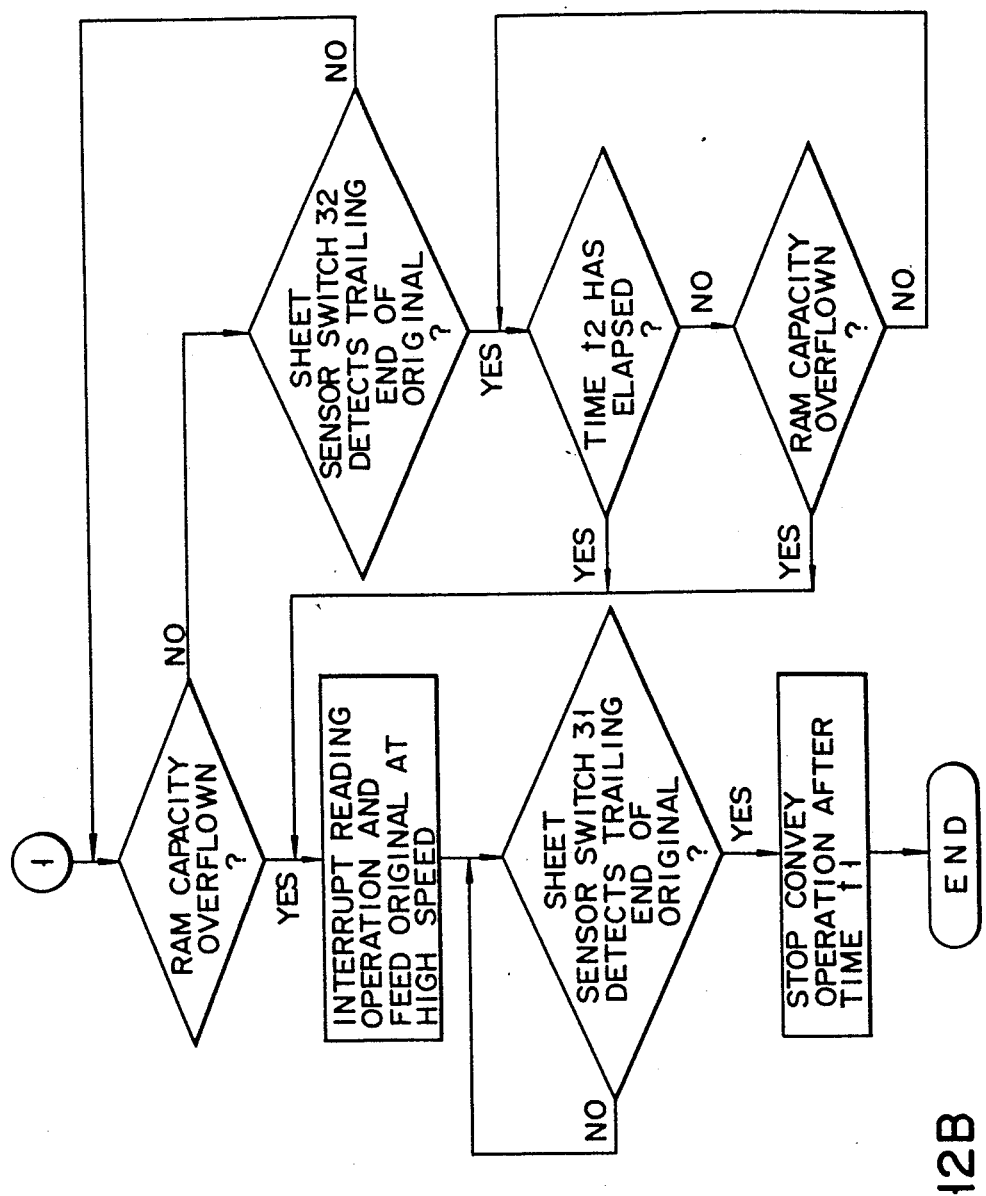

A case (1) wherein the original D is read while the image reading and recording units 2 and 3 are mounted on the control unit 1 will be described hereinafter with reference to the flow charts in FIGS. 12A and 12B.

When an operator inserts the original D in a sheet convey path between the control unit 1 and the image reading unit 2, the sheet sensor switch 32 detects the leading end of the original D. Therefore, the switch 56 arranged on the upper surface of the image reading unit 2 is turned on, and a state to wait depression of the switch plate 54 is set. In such a state, when the switch plate 54 is depressed and the switch 56 is turned on, the CPU 100 supplies a control signal to the cam motor 29 through the driver 112 to rotate the cam motor 29. Therefore, the cams 28 which are in contact with the arms 27 are rotated, and the arms 27, i.e., the platen roller 25, are moved downward. The upper or lower position of the cam 28 is monitored by the switch 30 which is in contact with the cam 28. When it is determined in response to a signal from the switch 30 that the platen roller 25 is spaced apart from the thermal head 62, the slide volume 53 detects a reading width. The motor drivers 106 and 108 are driven to rotate the recording sheet and original convey motors 26 and 35, thus conveying the original D. At the same time, a control signal is supplied to the CPU 126 in the image reading unit 2 through the control signal bus BUS1, and hence the CPU 126 drives the inverter 50 to turn on the xenon lamp 42. Then, after a predetermined period of time, i.e., a period until the original D reaches a position under the xenon lamp 42, elapses, a control signal is supplied to the CPU 126 in the image reading unit 2 through the control signal bus BUS1, so that the CPU 126 drives the CCD sensor driver 120. Therefore, the image signal photoelectrically converted by the CCD sensor 49 is amplified by the amplifier 121, and is binarized into binary data by the binary circuit 122, thus obtaining image data. The image data are sequentially stored in the RAM 102 in the control unit 1, the RAM 123 in the image reading unit 2, or the RAM 131 in the image recording unit 3, in response to a command from the read data selection key 13 on the operation panel 4 (a RAM selected in this manner is to be referred to as a "RAM" hereinafter). At this time, the RAM addresses supplied to the RAM 123 in the image reading unit 2 and the RAM 131 in the image recording unit 3 are supplied from the counters 124 and 132, respectively. The counters 124 and 132 are subjected to count-up control in response to a control signal supplied from the CPU 100 through the control signal bus BUS1.

Thus, the image data are sequentially stored in the selected RAM. When the sheet sensor switch 32 detects the trailing end of the original D before the capacity of the RAM is full, the image data read from the original D is continuously stored in the RAM until time t2 elapses from the detection time. This time t2 is a period until the trailing end of the original D passes through immediately under the xenon lamp 42 after it passed through the position of the sheet sensor switch 32. After the time t2 elapses, a reading operation is interrupted. It is also checked whether the RAM becomes full before the time t2 elapses. If the RAM becomes full before the time t2 elapses, the reading operation is immediately interrupted. If the capacity of the RAM is full before the trailing end of the original D is detected by the sheet sensor switch 32, the reading operation is also immediately interrupted. When the CPU 100 supplies a control signal to the CPU 126 in the image reading unit 2, the CPU 126 turns off the xenon lamp 42, and interrupts an operation of the CCD sensor 49 driven by the CCD sensor driver 120, thus interrupting the reading operations.

When the recording sheet and original convey motors 26 and 35 are rotated at high speed, the original D is fed at high speed, and the CPU waits until the sheet sensor switch 31 detects the trailing end of the original D. When the sheet sensor switch 31 detects the trailing end of the original D, high-speed rotation of the recording sheet and original convey motors 26 and 35 is continued during a time t1 from the detection time, and the recording sheet and original convey motors 26 and 35 are stopped after the time t1 has elapsed. The time t1 is a time period until the original D is delivered to the outside the apparatus by the above-mentioned high-speed feed operation, and is determined in accordance with a convey speed of the original D. Thus, a series of reading operations are completed.

Figure 13A:
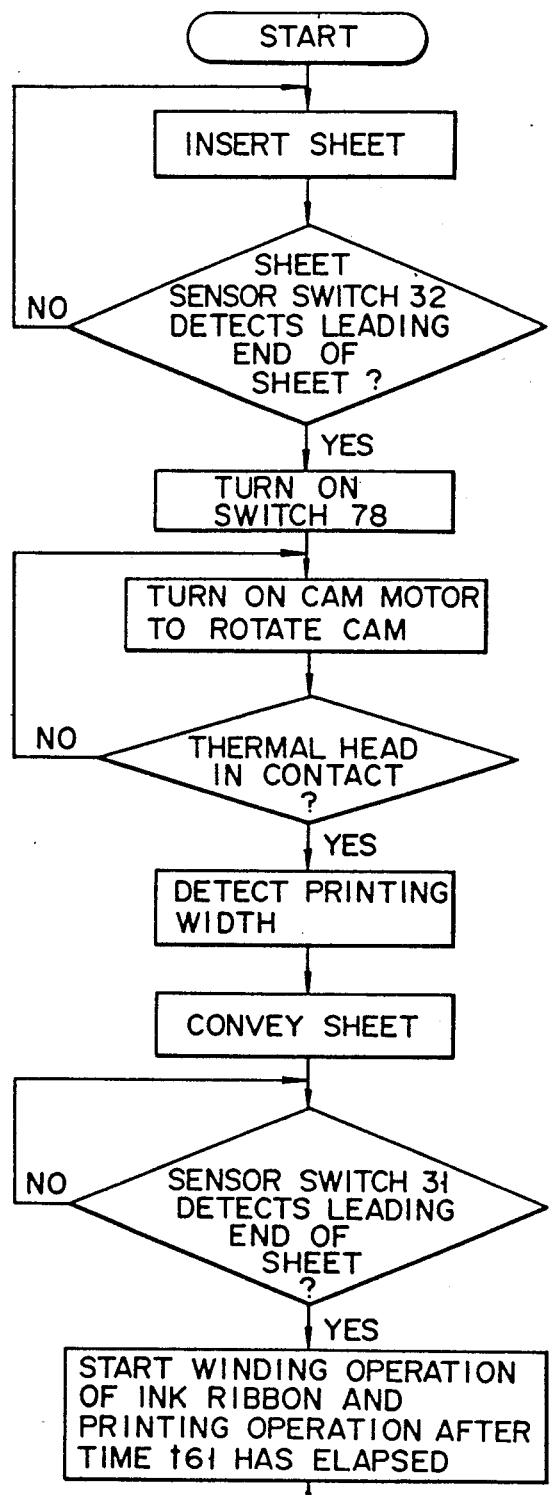
Figure 13B:
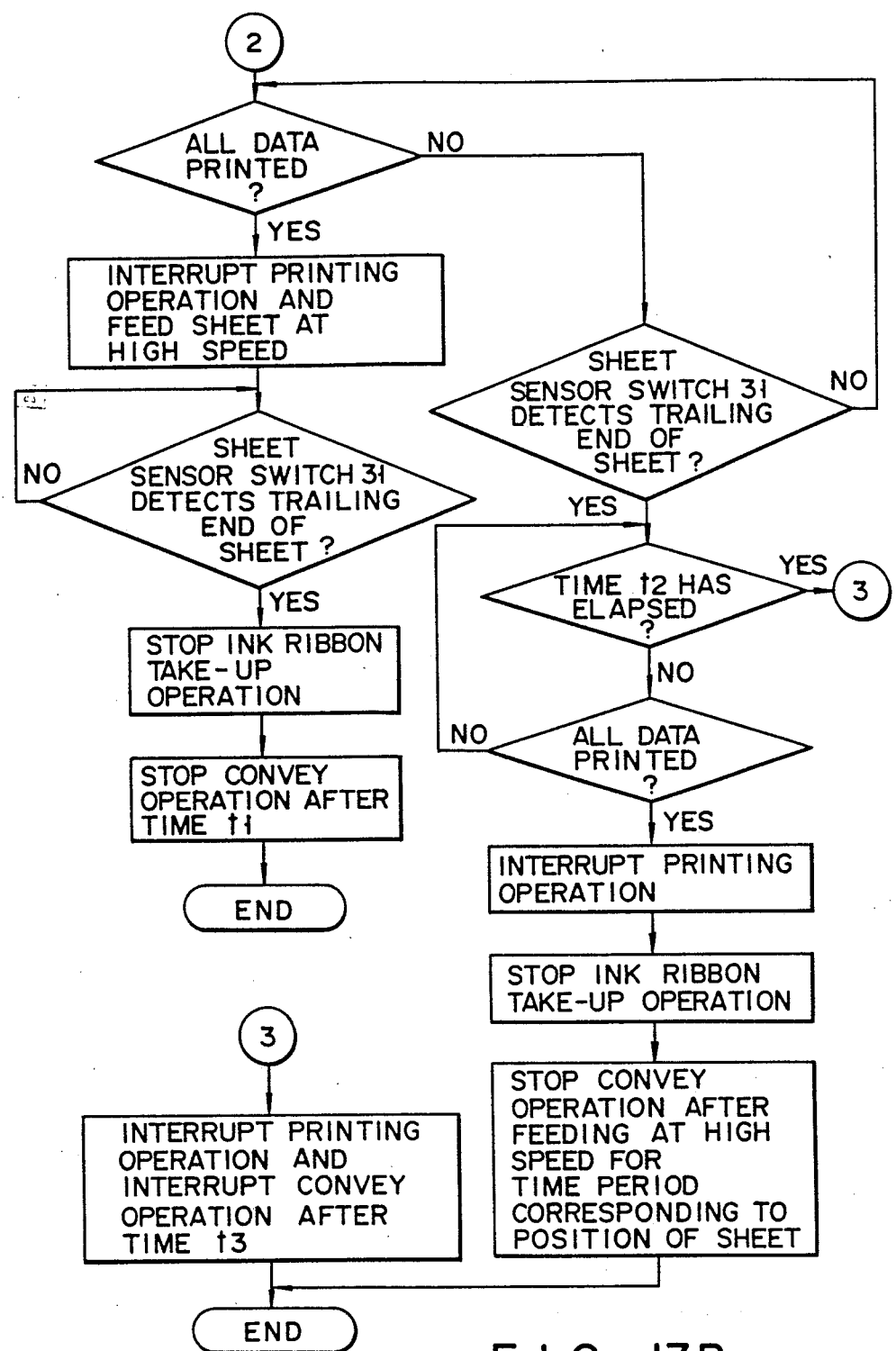

A case (2) wherein an image is formed on the recording sheet P while the image reading and recording units 2 and 3 are mounted on the control unit 1 will be described hereinafter with reference to the flow charts in FIGS. 13A and 13B.

Prior to forming an image, an operator depresses the read data selection key 13 on the operation panel 4, and selects the RAM 102 in the control unit 1, the RAM 123 in the image reading unit 2, or the RAM 131 in the image recording unit 3, as a supply source of image data (a RAM selected in this manner is to be referred to as a "RAM" hereinafter). Therefore, preparation for forming an image is completed.

In the above state, when an operator inserts the recording sheet P in a sheet convey path between the control unit 1 and the image reading unit 2 (image recording unit 3), the sheet sensor switch 32 detects the leading end of the sheet P. Therefore, the switch 78 arranged on the upper surface of the image recording unit 3 is turned on, and a state for waiting depression of the switch plate 76 is set. In such a state, when the switch 78 is turned on by depressing the switch plate 76, the CPU 100 supplies a control signal to the cam motor 29 through the driver 112 to rotate the cam motor 29. Therefore, the cams 28 which are in contact with the arms 27 are rotated, and the arms 27, i.e., the platen roller 25, are moved upward. On the other hand, the upper or lower position of the cam 28 is monitored by the switch 30 which is in contact with the cam 28.

When it is determined that the platen roller 25 is brought into contact with the thermal head 62 through the ink ribbon in response to a signal from the switch 30, the slide volume 53 detects a printing width. At this time, the printing width is set by the slide volume 53 arranged in the image reading unit 2. Then, the motor drivers 106 and 108 are driven to rotate the recording sheet and original convey motors 26 and 35, thus conveying the recording sheet P. This convey operation is continued until the leading end of the recording sheet P is detected by the sheet sensor switch 31. When the leading end of the recording sheet P is detected by the sheet sensor switch 31, the ink ribbon take-up motor 70 is driven in response to a control signal from the CPU 100 a time t61 after the leading end of the sheet P is detected, and a take-up operation of the ink ribbon 67 is started. The time t61 is a time period until the leading end of the recording sheet reaches immediately under the thermal head 62 from the sheet sensor switch 31. When the take-up operation is started, the thermal head controller 130 is driven through the control signal bus BUS1, and the image data is read out from the selected RAM. The readout data is supplied to the thermal head 62 to start a printing operation. When the selected RAM is the RAM 123 in the image reading unit 2 or the RAM 131 in the image recording unit 3, the RAM address is supplied from the counter 124 or 132. The counters 124 and 132 are subjected to count-up control in response to a control signal supplied from the CPU 100 through the control signal bus BUS1.

Thus, the image data read out from the RAM 131 are sequentially printed. When the trailing end of the recording sheet P is detected by the sheet sensor switch 31 before the printing operations for all the image data of the contents of the RAM 131 are completed, the printing operation of the image data on the recording sheet P is continued until a time t2 elapses from the detection time. This time t2 is a time period until the trailing end of the recording sheet P passes through immediately under the thermal head 62 after it passed through the position of the sheet sensor switch 31. After the time t2 elapses, the printing operation is interrupted. Then, the recording sheet and original convey motors 26 and 35 are rotated at high speed for a time t3. After the time t3 elapses, the recording sheet and original convey motors 26 and 35 are stopped. The time t3 is a time period until the recording sheet P is delivered to the outside the apparatus by the high-speed feed operation, and is determined in accordance with a convey speed of the recording sheet P. Thus, a series of printing operations are completed.

It is also checked whether the printing operations for all the image data of the contents of the RAM are completed before the time t2 elapses. If the printing operation is ended before the time t2 elapses, this operation is immediately interrupted. The ink ribbon take-up motor is stopped to interrupt a take-up operation of the ink ribbon 67. The recording sheet and original convey motors 26 and 35 are rotated at high speed for a period of time corresponding to the position of the recording sheet P at this time. After this period of time elapses, the recording sheet and original convey motors 26 and 35 are stopped. Therefore, the recording sheet P is delivered outside the apparatus, and a series of printing operations are completed.

When the printing operations for all the image data of the contents of the RAM are ended before the trailing end of the recording sheet P is detected by the sheet sensor switch 31, the printing operation is immediately interrupted. At the same time, when the recording sheet and original convey motors 26 and 35 are rotated at high speed, the recording sheet P is fed at high speed, and the CPU waits until the sheet sensor switch 31 detects the trailing end of the recording sheet P. When the sheet sensor switch 31 detects the trailing end of the recording sheet P, the ink ribbon take-up motor is stopped to interrupt the take-up operation of the ink ribbon 67. High-speed rotation of the recording sheet and original convey motors 26 and 35 is continued for a time t1 from the time when the take-up operation is interrupted. After a time t1 elapses, the recording sheet and original convey motors 26 and 35 are stopped. The time t1 is a time period until the original D is delivered to the outside the apparatus by the abovementioned high-speed feed operation, and is determined in accordance with a convey speed of the original D. Thus, a series of printing operations are completed.

Figure 14:
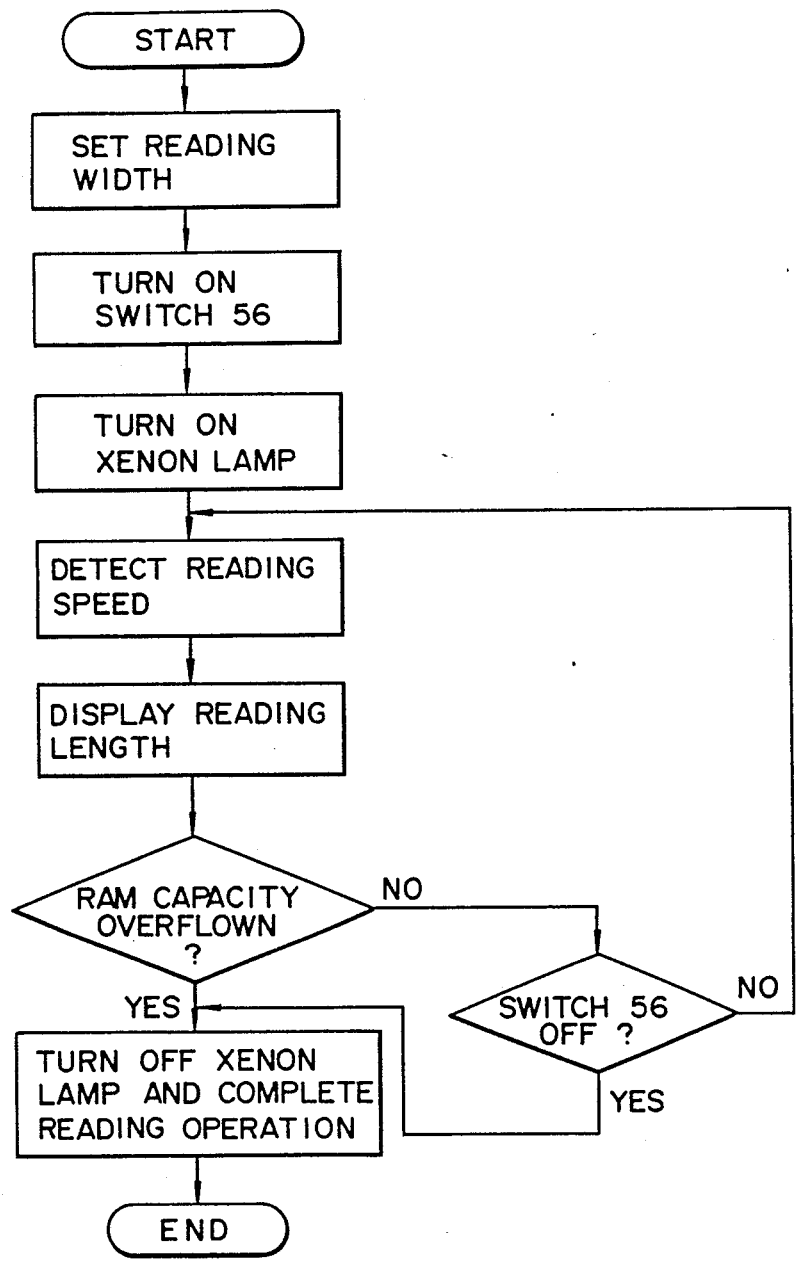

A case (3) wherein the image reading unit 2 is detached from the control unit 1 to independently read the original D will be described hereinafter with reference to the flow chart in FIG. 14. In this case, all the functions are operated under the control of the CPU 126 in the image reading unit 2.

First, an operator operates the slide volume 53 to set a reading width. Then, when the switch plate 54 is depressed, the switch 56 is turned on, thus turning on the xenon lamp 42. Therefore, preparation for a reading operation is completed. In such a state, when the image reading unit 2 is moved on the original D placed on a flat surface, the pinch roller 40 is rotated, and the rotary encoder 51 is rotated in correspondence with the rotation of the pinch roller 40. A relative moving speed of the image reading unit 2 with respect to the original D is calculated in accordance with the number of revolutions of the rotary encoder 51, and a read timing corresponding to this moving speed is supplied to the CCD driver 120. The image signal photoelectrically converted by the CCD sensor 49 is amplified by the amplifier 121. The amplified signal is binarized into binary data by the binary circuit 122, and the binary data are sequentially stored in the RAM 123, as image data. At this time, the RAM address is supplied from the counter 124. The counter 124 is subjected to count-up control in synchronism with a speed signal detected by the rotary encoder 51.

A reading length is displayed on the display 128 in parallel with the above-mentioned reading operation. More specifically, when the image reading unit 2 is moved on the original D placed on a flat surface, the rotary encoder 51 is rotated. A relative moving distance of the image reading unit 2 with respect to the original D in the sub-scanning direction is calculated in accordance with the number of revolutions of the rotary encoder 51, and the calculated moving distance is displayed on the display 128.

Thus, the image data are sequentially stored in the RAM 123. When the capacity of the RAM 123 is full, the xenon lamp 42 is turned off, and a series of reading operations are completed. On the other hand, if the switch 56 is turned off before the RAM 123 is full, the xenon lamp 42 is turned off at that time, and a series of reading operations are completed.

A case (4) wherein the image recording unit 3 is detached from the control unit 1, and independently forms an image on the recording sheet P will be described hereinafter with reference to the flow chart in FIG. 15.

In this case, all the functions are operated under the control of the CPU 134 in the image recording unit 3.

An operator transfers image data to be printed to the RAM 131 in the image recording unit 3, prior to forming an image. Then, the image recording unit 3 is removed from the control unit 1, and the slide volume 75 is operated to set a printing width. Then, when the switch plate 76 is depressed, the switch 78 is turned on, thus completing preparation for a printing operation. In the above state, when the image recording unit 3 is moved on the recording sheet P placed on a flat surface, the pinch roller 60 is rotated, and the rotary encoder 73 is rotated in correspondence with the rotation of the pinch roller 60. Therefore, a relative moving speed of the image recording unit 3, i.e., the thermal head 62, with respect to the recording sheet P is calculated, and a record timing corresponding to the moving speed is supplied to the thermal head controller 130. On the other hand, image data is read out from the RAM 131 in synchronism with the record timing, and readout data is supplied to the thermal head 62. At this time, the RAM address is supplied from the counter 132, and the counter 132 is subjected to count-up control in synchronism with the speed signal detected by the rotary encoder 73.

A printing length is displayed on the display 136 in parallel with the above-mentioned recording operation. More specifically, when the image recording unit 3 is moved on the recording sheet P placed on a flat surface, the rotary encoder 51 is rotated. A relative moving distance of the image recording unit 3 with respect to the recording sheet P in the sub-scanning direction is calculated in accordance with the number of revolutions of the rotary encoder 73, and the calculated moving distance is displayed on the display 136.

Thus, the image data are sequentially read out from the RAM 131, and are printed. When all the data of the contents of the RAM 131 are printed, a series of printing operations are ended. On the other hand, if the switch 78 is turned off before all the image data of the contents of the RAM 131 are printed, a series of printing operations are ended at that time.

Figure 16A:
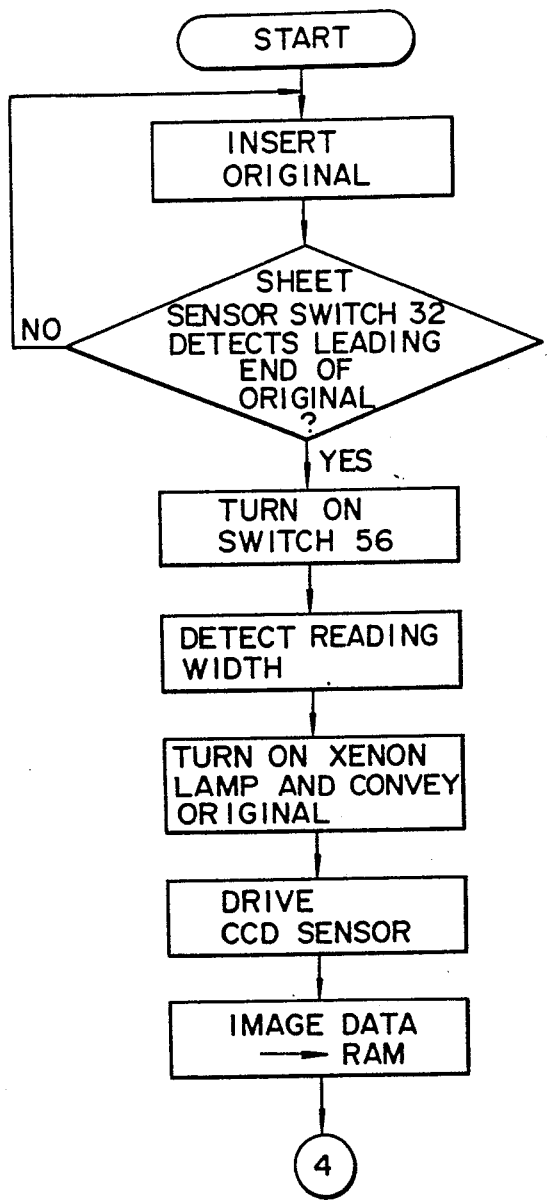

A case (5) wherein the original D is read while the image reading unit 2 is mounted on the control unit 1 will be described below with reference to the flow charts in FIGS. 16A and 16B.

In this case, a difference between an operation in the case (5) and the above-mentioned operation in the case (1) is as follows. In the case (5), an operation to separate the platen roller 25 from the thermal head 62 is not performed because the image recording unit 3 is not mounted on the control unit 1. In addition, it is determined whether the convey operation of the original D is completed, on the basis of only the sheet sensor switch 32, and the original D is conveyed by only the original convey motor 35.

In other words, since the image recording unit 3 is not mounted, the above-mentioned separate operation is not required. In addition, since the image recording unit 3 is not mounted, the sheet sensor switch 31 cannot perform a normal detection operation. Therefore, it is determined whether the convey operation is ended using only the sheet sensor switch 32. Furthermore, since the image recording unit 3 is not mounted, the recording sheet convey motor 26 is kept stopped to prevent jam or the like of the original D.

Only differences will be described hereinafter. In this mode, processing to move the platen roller 25 upward/- downward by the cam 28 is skipped. During the image reading operation, when the capacity of the RAM overflows before the sheet sensor switch 32 detects the trailing end of the original D, a reading operation is immediately stopped, and the original D is fed at high speed. In the process of the high-speed feed operation, a convey operation is stopped a time t51 after the trailing end of the original D is detected. This time t51 is a time period required for the original D to pass through the image reading unit 2. If the capacity of the RAM overflows before the time t2 elapses, i.e., the original D passes through immediately under the xenon lamp 42, after the sheet sensor switch 32 detects the trailing end of the original D, a reading operation is immediately interrupted, and the original D is fed at high speed. After a time t52 elapses, the convey operation is stopped. This time t52 is variable, and is determined in accordance with the position of the original D when the capacity of the RAM overflows. In addition, after a time t2 elapses, i.e., the original D passes through immediately under the xenon lamp 42, after the sheet sensor switch 32 detects the trailing end of the original D, the reading operation is interrupted at that time, and the original D is fed at high speed. After a time t53 elapses, the convey operation is stopped. The time t53 is a time period until the original D is delivered to the outside the image reading unit 2 after it passes through immediately under the xenon lamp 42.

Figure 17A:
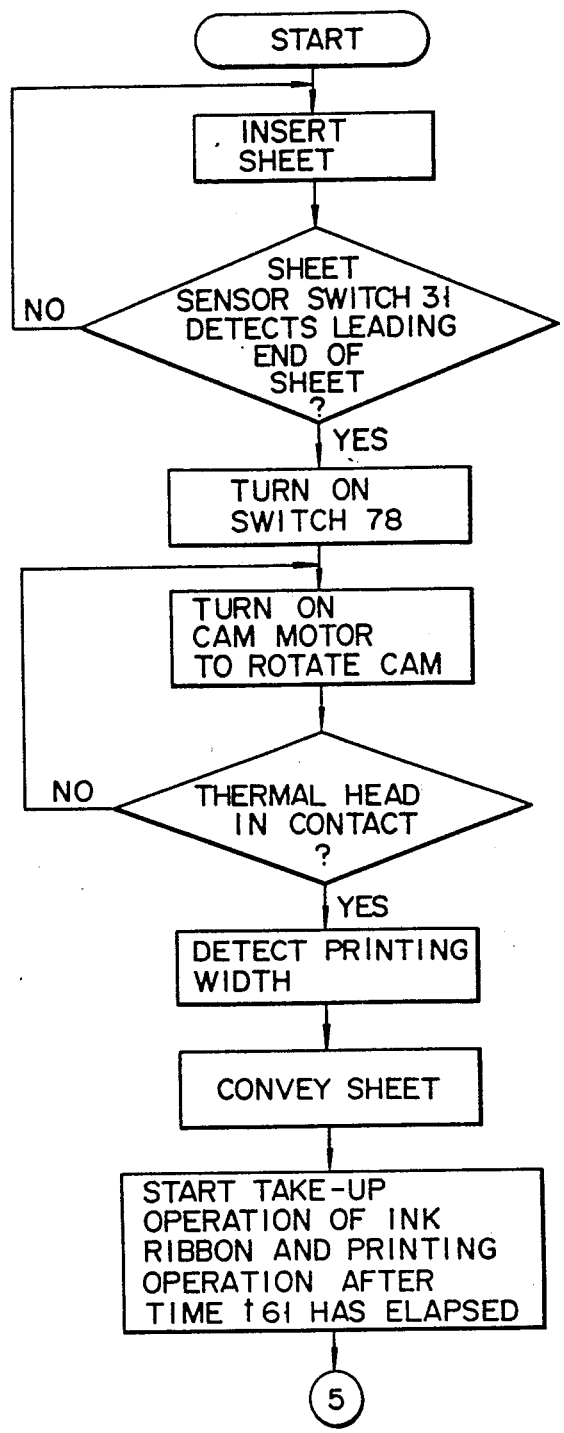
Figure 17B:
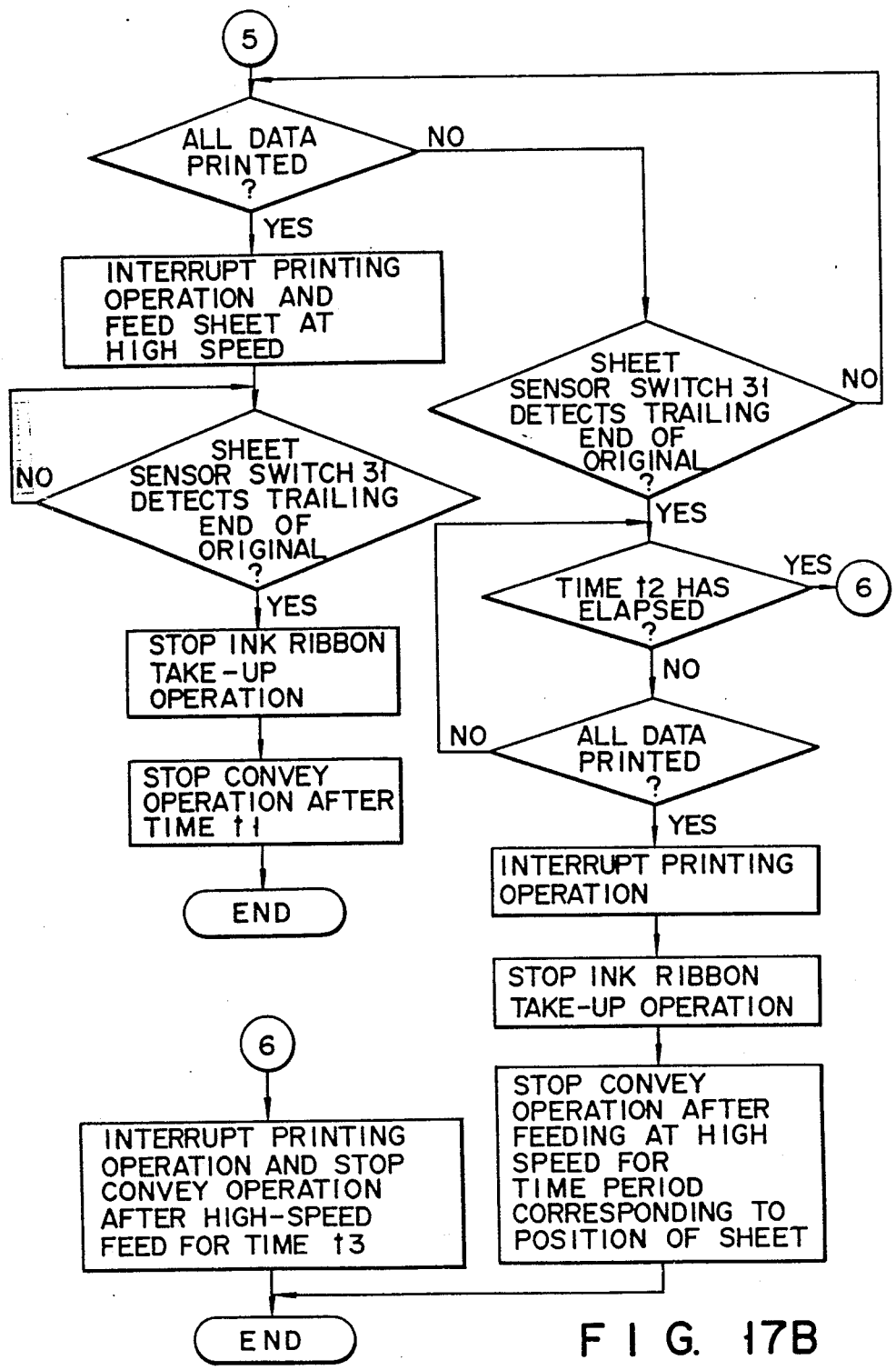

A case (6) wherein an image is formed on the recording sheet P while the image recording unit 3 is mounted on the control unit 1 will be described hereinafter with reference to the flow charts in FIGS. 17A and 17B.

In this case, a difference between the operation in the case (2) and an operation in the case (6) is as follows. In the case (6), it is determined whether a convey operation of the recording sheet P is completed on the basis of only the sheet sensor switch 31, and the recording sheet P is conveyed by only the recording sheet convey motor 26.

More specifically, since the image reading unit 2 is not mounted, the sheet sensor switch 32 cannot perform a normal detection operation. Therefore, it is determined whether the convey operation is ended using only the sheet sensor switch 31. In addition, since the image reading unit 2 is not mounted, the original convey motor 35 is kept stopped to prevent jam or the like of the recording sheet P.

Only differences will be described below. More specifically, the sheet sensor switch 31 detects whether the recording sheet P is inserted. Therefore, in this mode, a time t61 until the recording sheet P reaches immediately under the thermal head 62 is measured after the switch 78 is turned on. Since other processing are the same as those in the above-mentioned case (2), a description thereof will be omitted.

As has been described above, in this image forming apparatus, the image reading unit 2 can be detached from the control unit 1, and can be independently used as an image reading apparatus by a manual scanning operation. In addition, when the image recording unit 3 is detached from the control unit 1, the unit 3 can be independently used as an image recording apparatus by a manual scanning operation. Furthermore, when the image reading and recording units 2 and 3 are mounted on the control unit 1, image reading and recording operations can be performed while the original D and the recording sheet P are automatically conveyed. Therefore, this apparatus can be easily operated.

When the image recording unit 3 is removed from the control unit 1, and is independently used, in parallel with the image recording operation, a relative moving distance of the image recording unit 3 with respect to the recording sheet P in the sub-scanning direction is calculated in accordance with the number of revolutions of the rotary encoder 73, and the calculated distance is displaced on the display 136. Therefore, an operator can know a remaining amount of the image data stored in the RAM 131. Therefore, a waste of the ink ribbon 67 caused by a sub-scanning operation even after all the image data in the RAM 131 are recorded can be prevented. In addition, an image can be accurately recorded on a predetermined position of the recording sheet P.

In addition, when the image reading unit 2 is mounted on the control unit 1, and is used, the RAM 102 in the control unit 1 or the RAM 123 in the image reading unit 2 can be selected as a memory for storing the read image data in response to a command from the operation panel 4. When the image recording unit 3 is also mounted on the control unit 1, the RAM 131 in the image recording unit 3 can be selected by the operation panel 4. Therefore, an arbitrary RAM can be selected as a memory for storing the read image data. Therefore, a vacant RAM can be effectively used, and required image data is not destructed. During a record operation of the image data which will be performed later, the data need not be transferred among the RAMs in the control unit, the image reading unit, and the image recording unit. Therefore, the contents of the RAM are not destructed upon formation of the image. In addition, since the data need not be transferred among the RAMs, an operation can be simplified, and high-speed image formation can be realized.

As has been described above in detail, according to the present invention, there is provided an image forming apparatus which can inform an operator an image data amount of images formed up to the present time or a remaining image data amount when the image formation unit independently forms an image by a manual scanning operation, can prevent a waste of an ink ribbon, and can accurately form an image within a predetermined range of an image forming medium.

What is claimed is:

1. An image forming apparatus comprising:
   a control main body including first conveying means for conveying an original and an image forming medium;
   a reading main body detachable to said control main body, said reading main body including second conveying means for conveying the original in cooperation with said first conveying means when said reading main body is mounted on said control main body, reading means for reading an image of the original conveyed by said second conveying means to output data corresponding to the image and first memory means for storing the image data read by said reading means;
   an image formation main body detachable to said control main body, said image formation main body including third conveying means for conveying the image forming medium in cooperation with said first conveying means when said image formation main body is mounted on said control main body, second memory means for storing image data, and image forming means for scanning the image forming medium to form an image in accordance with the image data stored in said second memory means, on the image forming medium conveyed by said conveying means; and
   means for transmitting the image data stored in said first memory means to said second memory means when said reading main body and image formation main body are mounted on said control main body.

2. An apparatus according to claim 1, wherein said control main body comprises said data transmitting means and first power source means for driving said data transmitting means, and said image forming means comprises connecting means for electrically connecting said data transmitting means to said first and second memory means when said reading and image formation main bodies are mounted on said control main body.

3. An apparatus according to claim 2, wherein said reading main body comprises second power source means for driving said reading means and said first memory means when said reading main body is detached from said control main body to perform a reading operation.

4. An apparatus according to claim 3, wherein said image formation main body comprises third power source means for driving said second memory means and said image forming means when said image formation main body is detached from said control main body to perform an image formation operation.

5. An apparatus according to claim 4, wherein said first to third power source means respectively comprise secondary batteries, said control main body comprises a charger for charging said secondary battery of said first power source means, and said connecting means comprises means for connecting said charger to said secondary batteries of said second and third power source means, and causing said charger to charge said secondary batteries of said second and third power source means when said reading and image formation main bodies are mounted on said control main body.

6. An apparatus according to claim 5, wherein said control main body comprises a control housing having an upper surface and on which said first conveying means is formed, and reading conveying means and image formation conveying means which are arranged to be adjacent to each other, on which said reading and image formation main bodies are respectively mounted.

7. An image forming apparatus comprising:
   a control main body including first conveying means for conveying an original;
   a reading main body detachable to said control main body, said reading main body including reading means for reading an image of the original to output data corresponding to the image, memory means for storing the read image data, and second conveying means, which faces said first conveying means, for conveying the original between said first and second conveying means in cooperation with said first conveying means when said reading main body is mounted on said control main body;
   said control main body including means for detecting that an original is inserted between said first and second conveying means, driving said first conveying means to convey the original to said reading means, and causing said reading means to scan the original, when said reading main body is mounted on said control main body; and
   said reading main body including means for measuring a moving speed of said reading main body with respect to the original, and storing image data in said memory means at a timing corresponding to the speed when said reading main body is detached from said control main body and is moved on the original to perform a scanning operation.

8. An apparatus according to claim 7, wherein said reading main body comprises charging power source means for driving said memory means and said reading means when said reading main body is detached from said control main body to perform a reading operation.

9. An image forming apparatus comprising:
a control main body including first conveying means for conveying an image forming medium;
an image formation main body detachable to said control main body, said image formation main body including second conveying means for conveying the image forming medium in cooperation with said first conveying means when said image formation main body is mounted on said control main body, memory means for storing image data, and image forming means for scanning the image forming medium conveyed by said conveying means to form an image on the image forming medium in accordance with the image data stored in said memory means; and
said image formation main body comprising means for measuring a moving speed of said image formation main body with respect to the image forming medium to supply the image data from said memory means to said image forming means at a timing corresponding to the speed when said image formation main body is detached from said control main body and is moved on the original to perform a scanning operation.

10. An apparatus according to claim 9, wherein said control main body comprises memory means for storing image data, and image transmitting means for transmitting the image data stored in said memory means in said control main body to said memory means in said image formation main body when said image formation main body is mounted on said control main body.

11. An apparatus according to claim 10, wherein said image formation main body comprises charging power source means for driving said memory means and said image forming means when said image formation main body is detached from said control main body to perform an image formation operation.

12. An image forming apparatus comprising:
a control main body including a housing having one surface, original conveying means, arranged on the surface, for conveying an original along the surface, image forming medium conveying means, located on downstream side of said original conveying means, for conveying an image forming medium along the surface, and a platen, located in said image forming medium conveying means, and movably arranged in said housing;
a reading main body located on said original conveying means in said control main body, said reading main body including first conveying means for conveying an original in cooperation with said original conveying means, and reading means for reading an image from the conveying original to output data corresponding to the image;
an image formation main body located on said image forming medium conveying means in said control main body, said image formation main body including second conveying means for conveying the image forming medium in cooperation with said image forming medium conveying means, and image forming means having an image formation member for forming an image on the image forming medium in accordance with the image data when the image forming medium is conveyed by said conveying means;
image data supplying means for supplying the image data read by said reading means to said image forming means; and
said control main body comprising platen driving means for separating said platen from said image formation member to cause the original to pass through between said image forming medium conveying means and said second conveying means during an image reading operation, and for causing said platen to get close to said image formation member to form an image on the image forming medium which passes through between said image forming medium conveying means and said second conveying means in cooperation with said image formation member during an image formation operation.

13. An apparatus according to claim 12, wherein said image data supplying means comprises first memory means, arranged in said reading main body, for storing image data read by said reading means, second memory means, arranged in said image formation main body, for storing image data supplied to said image formation member, and data transmitting means for transmitting the image data stored in said memory means to said second memory means.

* * * * *